United States Patent
Ichimaru et al.

(10) Patent No.: US 12,122,709 B2
(45) Date of Patent: Oct. 22, 2024

(54) REINFORCED GLASS AND METHOD FOR PRODUCING REINFORCED GLASS

(71) Applicant: Nippon Electric Glass Co., Ltd., Shiga (JP)

(72) Inventors: Tomonori Ichimaru, Shiga (JP); Kiyotaka Kinoshita, Shiga (JP); Ken Yuki, Shiga (JP); Ryota Suzuki, Shiga (JP); Yuta Nagano, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 801 days.

(21) Appl. No.: 17/281,713

(22) PCT Filed: Oct. 8, 2019

(86) PCT No.: PCT/JP2019/039632
§ 371 (c)(1),
(2) Date: Mar. 31, 2021

(87) PCT Pub. No.: WO2020/075708
PCT Pub. Date: Apr. 16, 2020

(65) Prior Publication Data
US 2021/0387904 A1    Dec. 16, 2021

(30) Foreign Application Priority Data

Oct. 9, 2018  (JP) .................................. 2018-191054
Dec. 11, 2018  (JP) .................................. 2018-231539
(Continued)

(51) Int. Cl.
C03C 21/00    (2006.01)
C03C 3/085    (2006.01)
C03C 3/097    (2006.01)

(52) U.S. Cl.
CPC ............ *C03C 21/002* (2013.01); *C03C 3/085* (2013.01); *C03C 3/097* (2013.01)

(58) Field of Classification Search
None
See application file for complete search history.

(56) References Cited

U.S. PATENT DOCUMENTS 9,054,250 B2 *  6/2015  Murata ................. C03C 23/007
2010/0009154 A1   1/2010  Allan et al.
(Continued)

FOREIGN PATENT DOCUMENTS

JP    2011-527661       11/2011
JP    2011527661 A5 *   8/2012   ............. C03C 21/00
(Continued)

OTHER PUBLICATIONS

Taiwanese Office Action issued May 4, 2021 in the counterpart Taiwanese patent application No. 108136510 with the English translation of the Search Report.
(Continued)

*Primary Examiner* — Jodi C Franklin
(74) *Attorney, Agent, or Firm* — Wenderoth, Lind & Ponack, L.L.P.

(57) ABSTRACT

A tempered glass has a surface and a thickness, wherein a stress profile of the tempered glass includes a first peak at the surface, at which the compressive stress becomes a maximum, a first bottom at which the stress, which gradually reduces from the first peak in the depth direction, becomes a local minimum, a second peak at which the compressive stress, which gradually increases from the first bottom in the depth direction, becomes a local minimum, and a second bottom at which the tensile stress, which gradually reduces from the second peak in the depth direction, becomes a minimum. The compressive stress at the first peak is 500

(Continued)

MPa or more, the compressive stress at the second peak P2 is from 15 MPa to 250 MPa, and the depth of layer of the second peak is from 4% to 20% of the thickness.

8 Claims, 7 Drawing Sheets

(30) Foreign Application Priority Data

| Dec. 25, 2018 | (JP) | 2018-240718 |
|---|---|---|
| May 22, 2019 | (JP) | 2019-096352 |
| May 23, 2019 | (JP) | 2019-096572 |
| Aug. 6, 2019 | (JP) | 2019-144811 |
| Sep. 10, 2019 | (JP) | 2019-164611 |

(56) References Cited

U.S. PATENT DOCUMENTS

| 2010/0167091 A1 | 7/2010 | Tachiwana et al. |
|---|---|---|
| 2012/0321898 A1 | 12/2012 | Meinhardt et al. |
| 2013/0224492 A1 | 8/2013 | Bookbinder et al. |
| 2014/0370264 A1 | 12/2014 | Ohara et al. |
| 2016/0023944 A1 | 1/2016 | Bookbinder et al. |
| 2016/0122239 A1 | 5/2016 | Amin et al. |
| 2016/0347655 A1 | 12/2016 | Meinhardt et al. |
| 2017/0197876 A1 | 7/2017 | Oram et al. |
| 2017/0217824 A1 | 8/2017 | Ohara et al. |
| 2017/0295657 A1 | 10/2017 | Gross et al. |
| 2017/0297956 A1 | 10/2017 | Bookbinder et al. |
| 2017/0341973 A1 | 11/2017 | Gross et al. |
| 2017/0355640 A1 | 12/2017 | Oram et al. |
| 2018/0037498 A1 | 2/2018 | Ohara et al. |
| 2018/0044232 A1 | 2/2018 | Ohara et al. |
| 2018/0105461 A1 | 4/2018 | Schneider |
| 2018/0186685 A1 | 7/2018 | Murayama et al. |
| 2019/0016627 A1* | 1/2019 | Li ............................ C03C 4/18 |
| 2019/0161386 A1 | 5/2019 | Gross et al. |
| 2019/0276355 A1 | 9/2019 | Meinhardt et al. |
| 2020/0109083 A1 | 4/2020 | Imakita et al. |
| 2020/0156993 A1 | 5/2020 | Kinoshita et al. |

FOREIGN PATENT DOCUMENTS

| JP | 2015-511573 | 4/2015 |
|---|---|---|
| JP | 2017-535498 | 11/2017 |
| TW | 201733954 | 10/2017 |
| WO | 2007/142324 | 12/2007 |
| WO | 2010/005578 | 1/2010 |
| WO | 2013/088856 | 6/2013 |
| WO | 2013/130653 | 9/2013 |
| WO | 2017/123596 | 7/2017 |
| WO | 2017/126607 | 7/2017 |
| WO | 2017/177109 | 10/2017 |
| WO | 2017/218475 | 12/2017 |
| WO | 2019/004124 | 1/2019 |
| WO | 2019/021930 | 1/2019 |

OTHER PUBLICATIONS

Notice of Reasons for Refusal issued May 2, 2023 in corresponding Japanese Patent Application No. 2020-551165, with English language translation.
International Search Report issued Dec. 24, 2019 in International (PCT) Application PCT/JP2019/039632.
Office Action issued Sep. 6, 2022 in U.S. Appl. No. 17/417,523.
Office Action issued Mar. 29, 2022 in U.S. Appl. No. 17/417,523.
International Search Report issued Dec. 24, 2019 in International (PCT) Patent Application No. PCT/JP2019/039632.
International Preliminary Report on Patentability and Written Opinion of the International Searching Authority issued Apr. 8, 2021 in International (PCT) Patent Application No. PCT/JP2019/039632.
Request for the Submission of an Opinion issued Apr. 19, 2024 in corresponding Korean Patent Application No. 10-2021-7022729, with English translation.

* cited by examiner

REINFORCED GLASS AND METHOD FOR PRODUCING REINFORCED GLASS

TECHNICAL FIELD

The present invention relates to a tempered glass and a method of producing the same, and more particularly, to a tempered glass suitable for a cover glass for a cellular phone, a digital camera, a personal digital assistant (PDA), or a touch panel display, and a method of producing the same.

BACKGROUND ART

Devices such as a cellular phone (in particular, a smartphone), a digital camera, a PDA, a touch panel display, a large-screen television, and contact-less power transfer show a tendency of further prevalence. In those applications, a tempered glass obtained through ion exchange treatment has been used. In addition, in recent years, the use of the tempered glass in exterior components of a digital signage, a mouse, a smartphone, and the like is increasing.

A tempered glass includes, on its surface, a compressive stress layer formed by ion exchange treatment. Accordingly, the formation and extension of a crack in the surface are suppressed, and hence high strength is obtained. The strength of the tempered glass is considered to be capable of being improved by adjusting the formation mode of such compressive stress layer (e.g., Patent Literature 1).

CITATION LIST

Patent Literature 1: WO 2013/088856 A1

SUMMARY OF INVENTION

Technical Problem

However, the tempered glass has still room for improvement in terms of the achievement of higher impact resistance.

An object of the present invention is to provide a tempered glass having impact resistance higher than that of the related art.

Solution to Problem

According to one embodiment of the present invention, which has been devised in order to solve the above-mentioned problem, there is provided a tempered glass having a surface and a thickness T, wherein a stress profile of the tempered glass, which is obtained by measuring a stress in a depth direction from the surface with a compressive stress being represented by a positive number and a tensile stress being represented by a negative number, comprises: a first peak at the surface, at which the compressive stress takes a maximum value; a first bottom at which the stress, which gradually reduces from the first peak in the depth direction, takes a local minimum value; a second peak at which the compressive stress, which gradually increases from the first bottom in the depth direction, takes a local maximum value; and a second bottom at which the tensile stress, which gradually reduces from the second peak in the depth direction, takes a minimum value, wherein the compressive stress at the first peak is 500 MPa or more, wherein the compressive stress at the second peak is from 15 MPa to 250 MPa, and wherein the second peak is present at a depth of from 4% to 20% of the thickness T. The inventors of the present invention have made extensive investigations, and as a result, have recognized that the tempered glass having such stress profile has high impact resistance. In particular, it is important for increasing the impact resistance that the compressive stress at the second peak (local maximum value) and the position thereof in the depth direction be set to fall within the above-mentioned numerical ranges.

In the above-mentioned configuration, it is preferred that the stress profile have a zero stress point at which the stress becomes zero between the second peak and the second bottom, and the zero stress point be present at a depth of from 10% to 35% of the thickness T from the surface. With this configuration, the compressive stress can be generated so as to reach a deep site, and hence the impact resistance can be expected to improve.

In the above-mentioned configuration, it is preferred that the stress at the first bottom be from −50 MPa to +100 MPa. With this configuration, the tensile stress at the second bottom can be relatively reduced to keep balance between the compressive stress and the tensile stress, and hence the impact resistance can be expected to be improved.

In the above-mentioned configuration, it is preferred that the stress at the first bottom be 0 MPa or more and +65 MPa or less. With this configuration, no tensile stress is generated in a surface layer portion of the tempered glass, and hence the occurrence of cracking during the production process of the tempered glass can be suppressed.

In the above-mentioned configuration, it is preferred that the stress at the first bottom be −30 MPa or more and less than 0 MPa. With this configuration, the tensile stress at the second bottom is relatively reduced to keep balance between the compressive stress and the tensile stress, and hence the impact resistance can be expected to be improved.

In the above-mentioned configuration, it is preferred that the first bottom be present at a depth of from 0.5% to 12% of the thickness T from the surface.

In the above-mentioned configuration, it is preferred that a distance from the first bottom to the second peak in the depth direction be 3% or more of the thickness T.

In the above-mentioned configuration, it is preferred that the compressive stress at the first peak be 700 MPa or more, and the second peak be present at a depth of 7.3% or more of the thickness T from the surface.

In the above-mentioned configuration, it is preferred that the thickness T be from 0.3 mm to 0.9 mm, and the tempered glass have the stress profile in each of main surfaces and end surfaces thereof.

In the above-mentioned configuration, it is preferred that the thickness T fall within a range of 0.45 mm or more and 0.85 mm or less, the compressive stress at the first peak fall within a range of 700 MPa or more and 850 MPa or less, the compressive stress at the second peak fall within a range of 20 MPa or more and 80 MPa or less, the second peak be present within a depth range of 7.3% or more and 20% or less of the thickness T from the surface, the stress profile have a zero stress point at which the stress becomes zero between the second peak and the second bottom, the zero stress point be present within a depth range of 17% or more and 25% or less of the thickness T from the surface, and a maximum absolute value of the tensile stress fall within a range of 40 MPa or more and 60 MPa or less.

In the above-mentioned configuration, it is preferred that the tempered glass comprise as a glass composition, in terms of mass %, 40% to 70% of $SiO_2$, 10% to 30% of $Al_2O_3$, 0% to 10% of $B_2O_3$, 2% to 11% of $Li_2O$, 5% to 25% of $Na_2O$, 0% to 10% of $K_2O$, 0% to 6% of MgO, 0% to 10% of ZnO, and 0% to 20% of $P_2O_5$.

According to one embodiment of the present invention, which has been devised in order to solve the above-mentioned problem, there is provided a method of producing a tempered glass, for obtaining a tempered glass by subjecting a glass to be tempered containing a first alkali metal ion to ion exchange treatment, the method comprising: a first ion exchange step of bringing the glass to be tempered into contact with a first molten salt containing a second alkali metal ion having a larger ionic radius than the first alkali metal ion to introduce the second alkali metal ion into the glass to be tempered; a second ion exchange step of bringing, after the first ion exchange step, the glass to be tempered into contact with a second molten salt containing the first alkali metal ion to desorb at least part of the second alkali metal ion from the glass to be tempered; and a third ion exchange step of bringing, after the second ion exchange step, the glass to be tempered into contact with a third molten salt containing the second alkali metal ion to introduce the second alkali metal ion into the glass to be tempered. The method of producing a tempered glass comprising such steps can provide a tempered glass having high impact resistance.

In the above-mentioned configuration, it is preferred that the first ion exchange step comprise introducing the second alkali metal ion to a depth of 10.5% or more of a thickness T of the glass to be tempered from a surface thereof, the second ion exchange step comprise desorbing at least part of the second alkali metal ion in a region ranging from the surface of the glass to be tempered and being shallower than 10% of the thickness T, and the third ion exchange step comprise introducing the second alkali metal ion to a region ranging from the surface of the glass to be tempered and being shallower than 7% of the thickness T. In this case, it is preferred that, in a region deeper than the above-mentioned depth, no alkali metal ion be introduced or desorbed. With this configuration, the tempered glass having high impact resistance can be more reliably obtained.

In the above-mentioned configuration, it is preferred that the first alkali metal ion be a Na ion, the second alkali metal ion be a K ion, the first molten salt contain $KNO_3$, the second molten salt contain $NaNO_3$, and the third molten salt contain $KNO_3$.

In the above-mentioned configuration, it is preferred that the first alkali metal ion be a Na ion, the second alkali metal ion be a K ion, the first molten salt contain at least $KNO_3$ out of $NaNO_3$ and $KNO_3$, the second molten salt contain at least $NaNO_3$ out of $NaNO_3$ and $KNO_3$, a $KNO_3$ concentration in the first molten salt be higher than a $NaNO_3$ concentration therein, and a $NaNO_3$ concentration in the second molten salt be higher than a $KNO_3$ concentration therein. With this configuration, the first ion exchange step and the second ion exchange step can be efficiently performed.

In this case, it is preferred that the $KNO_3$ concentration in the first molten salt be 50 mass % or more, the $NaNO_3$ concentration in the first molten salt be less than 50 mass %, the $NaNO_3$ concentration in the second molten salt be 60 mass % or more, the $KNO_3$ concentration in the second molten salt be 40 mass % or less, a $KNO_3$ concentration in the third molten salt be higher than the $KNO_3$ concentration in the first molten salt, an ion exchange treatment temperature in the first ion exchange step be from 420° C. to 500° C., an ion exchange treatment temperature in the second ion exchange step be from 420° C. to 500° C., an ion exchange treatment temperature in the third ion exchange step be lower than the ion exchange treatment temperature in the first ion exchange step by 10° C. or more, an ion exchange treatment time in the first ion exchange step be from 2 hours to 40 hours, an ion exchange treatment time in the second ion exchange step be from 2 hours to 40 hours, and an ion exchange treatment time in the third ion exchange step be shorter than the ion exchange treatment time in each of the first ion exchange step and the second ion exchange step.

According to one embodiment of the present invention, which has been devised in order to solve the above-mentioned problem, there is provided a method of producing a tempered glass, for obtaining a tempered glass by subjecting a glass to be tempered containing a first alkali metal ion to ion exchange treatment, the method comprising: a first ion exchange step of bringing the glass to be tempered into contact with a first molten salt containing a second alkali metal ion having a larger ionic radius than the first alkali metal ion to introduce the second alkali metal ion into the glass to be tempered; and a second ion exchange step of bringing, after the first ion exchange step, the glass to be tempered into contact with a second molten salt containing a third alkali metal ion, which has a larger ionic radius than the second alkali metal ion, and the first alkali metal ion to desorb at least part of the second alkali metal ion from the glass to be tempered, and to introduce the third alkali metal ion into the glass to be tempered. The method of producing a tempered glass comprising such steps can provide a tempered glass having high impact resistance.

In the above-mentioned configuration, it is preferred that the second ion exchange step comprise introducing the third alkali metal ion to a region ranging from the surface of the glass to be tempered and being shallower than 7% of the thickness T. In this case, it is preferred that, in a region deeper than the above-mentioned depth, no alkali metal ion be introduced or desorbed. With this configuration, the tempered glass having high impact resistance can be more reliably obtained.

In the above-mentioned configuration, it is preferred that the glass to be tempered further contain the second alkali metal ion.

In the above-mentioned configuration, it is preferred that the first alkali metal ion be a Li ion, the second alkali metal ion be a Na ion, the third alkali metal ion be a K ion, and a Li ion concentration in the second molten salt be 100 ppm by mass or more.

In the above-mentioned configuration, it is preferred that the first molten salt contain $NaNO_3$, and the second molten salt contain $LiNO_3$ and $KNO_3$.

In the above-mentioned configuration, it is preferred that the first alkali metal ion be a Li ion, the second alkali metal ion be a Na ion, the third alkali metal ion be a K ion, the first molten salt contain at least $NaNO_3$ out of $NaNO_3$ and $KNO_3$, a $NaNO_3$ concentration in the first molten salt be higher than a $KNO_3$ concentration therein, the second molten salt contain $LiNO_3$ and $KNO_3$, and a $LiNO_3$ concentration in the second molten salt be lower than a $KNO_3$ concentration therein. With this configuration, the first ion exchange step and the second ion exchange step can be efficiently performed.

In this case, it is preferred that the $NaNO_3$ concentration in the first molten salt be 50 mass % or more, the $KNO_3$ concentration in the first molten salt be less than 50 mass %, the $LiNO_3$ concentration in the second molten salt be from 0.5 mass % to 5 mass %, the $KNO_3$ concentration in the second molten salt be from 95 mass % to 99.5 mass %, an ion exchange treatment temperature in the first ion exchange step be from 350° C. to 480° C., an ion exchange treatment temperature in the second ion exchange step be from 350° C. to 480° C., an ion exchange treatment time in the first ion exchange step be from 1 hour to 20 hours, and an ion exchange treatment time in the second ion exchange step be shorter than the ion exchange treatment time in the first ion exchange step.

In the above-mentioned configuration, it is preferred that the first ion exchange step comprise introducing the second alkali metal ion to a region ranging from a surface of the glass to be tempered and being deeper than 10% of a thickness T thereof, and the second ion exchange step comprise desorbing at least part of the second alkali metal ion in a region ranging from the surface of the glass to be tempered and being shallower than 10% of the thickness T. In this case, it is preferred that, in a region deeper than the above-mentioned depth, no alkali metal ion be introduced or desorbed.

In the above-mentioned configuration, it is preferred that the first molten salt contain the second alkali metal ion and the third alkali metal ion.

Advantageous Effects of Invention

According to the present invention, the tempered glass having impact resistance higher than that of the related art is obtained.

DESCRIPTION OF EMBODIMENTS

A tempered glass according to an embodiment of the present invention is described below.

First Embodiment

Figure 1:
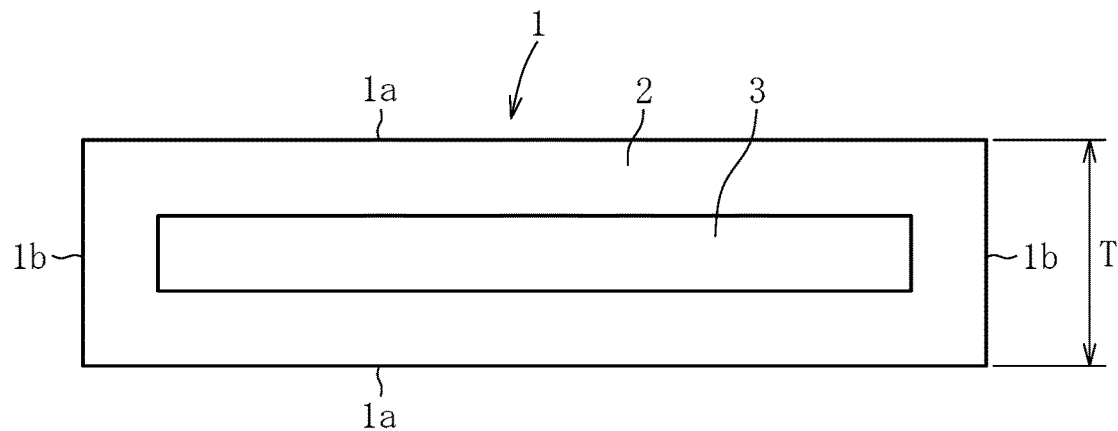
FIG. 1 is a schematic view for illustrating a cross-section of a tempered glass according to a first embodiment of the present invention.

As illustrated in FIG. 1, a tempered glass 1 according to a first embodiment of the present invention is a chemically tempered glass subjected to chemical tempering by ion exchange and having a sheet shape, and comprises a compressive stress layer 2 and a tensile stress layer 3. A thickness T of the tempered glass 1, which may be arbitrarily set, is preferably 2.0 mm or less, more preferably 1.8 mm or less, 1.6 mm or less, 1.4 mm or less, 1.2 mm or less, 1.0 mm or less, 0.9 mm or less, or 0.85 mm or less, still more preferably 0.8 mm or less, and is preferably 0.03 mm or more, 0.05 mm or more, 0.1 mm or more, 0.15 mm or more, 0.2 mm or more, 0.25 mm or more, 0.3 mm or more, 0.35 mm or more, 0.4 mm or more, 0.45 mm or more, 0.5 mm or more, or 0.6 mm or more, more preferably 0.65 mm or more.

The compressive stress layer 2 is formed in a surface layer portion, which comprises main surfaces 1a and end surfaces 1b, of the tempered glass 1. The tensile stress layer 3 is formed in an inner portion of the tempered glass 1, that is, at a position deeper than that of the compressive stress layer 2.

Figure 2:
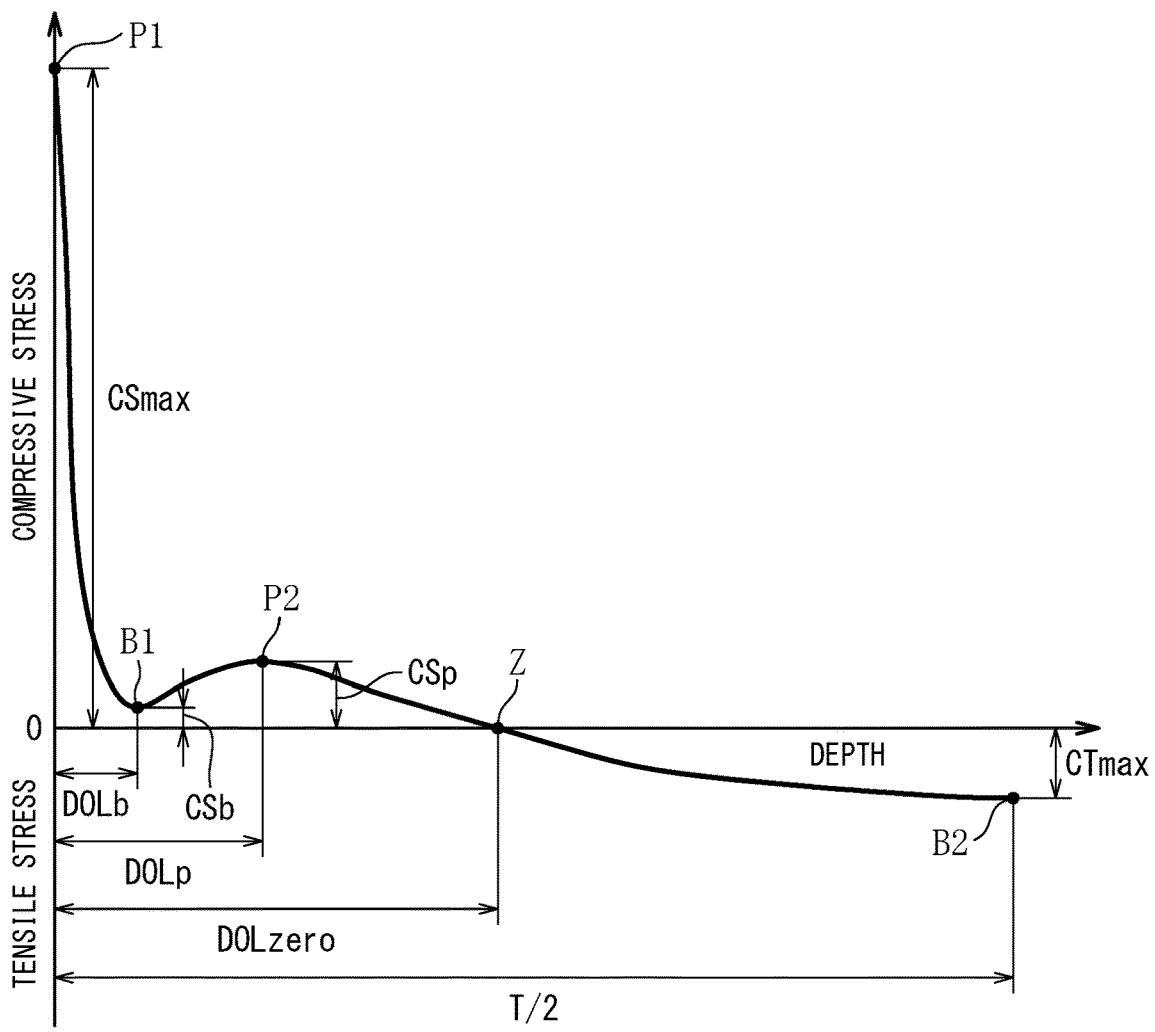
FIG. 2 is a graph for showing the outline of the stress profile of the tempered glass according to the first embodiment of the present invention in its thickness direction.

The stress profile (stress distribution) of the tempered glass 1 is obtained by measuring a stress in a depth direction (direction orthogonal to the main surfaces 1a) from a main surface 1a side with a compressive stress being represented by a positive number and a tensile stress being represented by a negative number. The stress profile of the tempered glass 1 thus obtained is, for example, as shown in FIG. 2. In the graph of FIG. 2, an axis of ordinate indicates a stress and an axis of abscissa indicates a position (depth) in the thickness direction with respect to one of the main surfaces 1a. In the graph of FIG. 2, a stress of a positive value represents a compressive stress, and a stress of a negative value represents a tensile stress. That is, it is shown that, as the absolute value of a stress in the graph of FIG. 2 becomes larger, the stress becomes larger. FIG. 2 is a conceptual view exaggerated for understanding, and the stress profile of the tempered glass 1 is not limited to this mode.

The stress profile of the tempered glass 1 comprises a first peak P1, a first bottom B1, a second peak P2, and a second bottom B2 in the stated order from the main surface 1a side in the depth direction (direction orthogonal to the main surfaces 1a).

The first peak P1 is the maximum value of the compressive stress, and is present at each of the main surfaces 1a. A compressive stress CSmax at the first peak P1 is 500 MPa or more, preferably from 600 MPa to 1,100 MPa, more preferably from 600 MPa to 1,000 MPa, from 700 MPa to 900 MPa, or from 750 MPa to 850 MPa.

At the first bottom B1, with the stress gradually reducing from the first peak P1 in the depth direction, the stress takes a local minimum value. A case in which a stress CSb at the first bottom B1 is a compressive stress (positive value) is shown as an example in FIG. 2, but the stress CSb may be a tensile stress (negative value). As the stress CSb at the first bottom B1 becomes lower, a tensile stress CTmax at the second bottom B2 becomes lower to make behavior at the time of breakage slower. The stress CSb at the first bottom B1 is preferably +100 MPa or less, more preferably +90 MPa or less, +80 MPa or less, +70 MPa or less, or +60 MPa or less. However, when the stress CSb at the first bottom B1 is too low, a crack is generated in the surface during a tempering step to degrade visibility. The stress CSb at the first bottom B1 is preferably −50 MPa or more, more preferably −45 MPa or more, −40 MPa or more, −35 MPa or more, or −30 MPa or more. The stress CSb at the first bottom B1 may be 0 MPa or more and +65 MPa or less, or may be −30 MPa or more and less than 0 MPa. A depth DOLb of the first bottom B1 is preferably from 0.5% to 12% of the thickness T, more preferably from 1% to 7% of the thickness T.

At the second peak P2, with the stress gradually increasing from the first bottom B1 in the depth direction, the stress takes a local maximum value. A stress CSp at the second peak P2 is a compressive stress. The compressive stress CSp at the second peak P2 is from 15 MPa to 250 MPa, preferably from 15 MPa to 240 MPa, from 15 MPa to 230 MPa, from 15 MPa to 220 MPa, from 15 MPa to 210 MPa, from 15 MPa to 200 MPa, from 15 MPa to 190 MPa, from 15 MPa to 180 MPa, from 15 MPa to 175 MPa, from 15 MPa to 170 MPa, from 15 MPa to 165 MPa, from 15 MPa to 160 MPa, or from 18 MPa to 100 MPa, more preferably from 20 MPa to 80 MPa. A depth DOLp of the second peak P2 is from 4% to 20% of the thickness T, preferably from 4% to 19%, from 4% to 18.5%, from 4% to 18%, from 4% to 17.5%, or from 4% to 17%, more preferably from 4.5% to 17%, from 5% to 17%, from 6% to 17%, from 7.3% to 17%, or from 8% to 15% of the thickness T.

A distance from the first bottom B1 to the second peak P2 in the depth direction, that is, DOLp-DOLb is 3% or more of the thickness T, preferably 4% or more of the thickness T, more preferably from 5% to 13% of the thickness T.

At the second bottom B2, the stress, which gradually reduces from the second peak P2 in the depth direction, takes the minimum value of the tensile stress (maximum value in terms of absolute value). The absolute value of the tensile stress CTmax at the second bottom B2 is 70 MPa or less, preferably 65 MPa or less, or 60 MPa or less, more preferably from 40 MPa to 55 MPa.

The product of the tensile stress CTmax at the second bottom B2 and the thickness T is preferably −70 MPa·mm or more, more preferably −65 MPa·mm or more, −60 MPa·mm or more, or −55 MPa mm or more. In addition, the product of the tensile stress CTmax at the second bottom B2 and the thickness T is preferably −5 MPa·mm or less, −10 MPa·mm or less, −15 MPa·mm or less, −20 MPa·mm or less, −25 MPa·mm or less, or −30 MPa·mm or less.

Between the second peak P2 and the second bottom B2, there is a zero stress point Z at which the stress becomes zero. In general, it is difficult for a depth DOLzero of the zero stress point Z to exceed 20% of the thickness T, and its physical limit is about 22%. However, in this embodiment, a DOLzero exceeding the limit value can be obtained. As the depth DOLzero of the zero stress point Z increases, strength against penetration by a protruding object becomes higher, and the depth DOLzero is preferably 10% or more, 10.5% or more, 11% or more, 11.5% or more, 12% or more, 12.5% or more, 13% or more, 13.5% or more, 14% or more, 14.5% or more, 15% or more, 15.5% or more, 16% or more, 16.5% or more, 17% or more, 17.5% or more, or 18% or more, more preferably 18.5% or more, 19% or more, 19.5% or more, 20% or more, 20.5% or more, 21% or more, 21.5% or more, 22.0% or more, 22.5% or more, 23% or more, or 23.5% or more, most preferably 24% or more of the thickness T. However, when the depth DOLzero of the zero stress point Z is excessively large, an excessive tensile stress may be generated at the first bottom B1 or the second bottom B2. Thus, the depth DOLzero of the zero stress point Z is preferably 35% or less, 34.5% or less, 34% or less, 33.5% or less, 33% or less, 32.5% or less, 32% or less, 31.5% or less, 31% or less, 30.5% or less, 30% or less, 29.5% or less, 29% or less, 28.5% or less, or 28% or less, more preferably 27% or less of the thickness T.

In this embodiment, the tempered glass 1 has a similar stress profile in each of the end surfaces 1b as well. That is, the stress profile of the tempered glass 1 includes: a first peak at each of the end surfaces 1b, at which the compressive stress takes a maximum value; a first bottom at which the stress, which gradually reduces from the first peak in the depth direction, takes a local minimum value; a second peak at which the compressive stress, which gradually increases from the first bottom in the depth direction, takes a local maximum value; and a second bottom at which the tensile stress, which gradually reduces from the second peak in the depth direction, takes a minimum value, wherein the compressive stress at the first peak is 500 MPa or more, wherein the compressive stress at the second peak is from 15 MPa to 250 MPa, and wherein the second peak is present at a depth of from 4% to 20% of the thickness T. In addition, the preferred ranges of the stress profile for each of the main surfaces 1a may be similarly applied to the preferred ranges of the stress profile for each of the end surfaces 1b.

Values obtained by measurement and synthesis with, for example, FSM-6000LE and SLP-1000 manufactured by Orihara Manufacturing Co., Ltd. may be used as the stress of the tempered glass 1 and its distribution.

The tempered glass 1 having the configuration as described above may be produced by, for example, the following procedure. First, as a preparation step, a sheet-shaped glass that contains an alkali metal oxide as a composition and is to be subjected to tempering treatment (hereinafter referred to as "glass to be tempered") is prepared. Next, a first ion exchange step (first tempering step) of bringing a surface of the glass to be tempered into contact with a first molten salt, a second ion exchange step (relaxing step) of bringing the surface of the glass to be tempered into contact with a second molten salt, and a third ion exchange step (second tempering step) of bringing the surface of the glass to be tempered into contact with a third molten salt are performed in the stated order. In each of the ion exchange steps, the glass to be tempered is preferably immersed in the molten salt.

It is preferred that the glass to be tempered to be prepared in the preparation step comprise, for example, as a glass composition, in terms of mass %, 40% to 70% of $SiO_2$, 10% to 30% of $Al_2O_3$, 0% to 3% of $B_2O_3$, 5% to 25% of $Na_2O$, 0% to 5.5% of $K_2O$, 0% to 10% of $Li_2O$, 0% to 5.5% of MgO, and 2% to 10% of $P_2O_3$.

Described below are reasons why the composition as described above is preferred. In the description of the content range of each component, the expression "%" means "mass %" unless otherwise specified.

$SiO_2$ is a component that forms a glass network. When the content of $SiO_2$ is too small, vitrification does not occur easily, and acid resistance is liable to lower. Thus, a suitable lower limit range of the content of $SiO_2$ is 40% or more, 40.5% or more, 41% or more, 41.5% or more, 42% or more, 42.5% or more, 43% or more, 44% or more, 45% or more, 46% or more, 47% or more, 48% or more, or 49% or more, particularly 50% or more. Meanwhile, when the content of $SiO_2$ is too large, meltability and formability are liable to lower, and a thermal expansion coefficient becomes too low, with the result that it becomes difficult to match the thermal expansion coefficient with those of peripheral materials. Thus, a suitable upper limit range of the content of $SiO_2$ is 70% or less, 68% or less, 65% or less, 62% or less, 60% or less, 58% or less, 57% or less, 56% or less, or 55% or less, particularly 54% or less.

$Al_2O_3$ is a component that increases an ion exchange rate, and is also a component that increases a Young's modulus to increase a Vickers hardness. Further, $Al_2O_3$ is a component that increases a viscosity at which phase separation occurs.

The content of $Al_2O_3$ is from 10% to 30%. When the content of $Al_2O_3$ is too small, the ion exchange rate and the Young's modulus are liable to lower. Thus, a suitable lower limit range of the content of $Al_2O_3$ is 10% or more, 11% or more, 12% or more, 13% or more, 14% or more, 14.5% or more, 15% or more, 15.5% or more, 16% or more, 16.5% or more, 17% or more, 17.5% or more, 18% or more, 18.5% or more, or 19% or more, particularly 19.5% or more. Meanwhile, when the content of $Al_2O_3$ is too large, devitrified crystals are liable to be deposited in the glass, and it becomes difficult to form a sheet shape by an overflow down-draw method or the like. In particular, when the sheet shape is formed by the overflow down-draw method through use of an alumina refractory as a forming body refractory, a devitrified crystal of spinel is liable to be deposited at an interface between the glass and the alumina refractory. In addition, the acid resistance reduces and hence it becomes difficult to apply the glass to an acid treatment step. In addition, viscosity at high temperature increases, which is liable to lower the meltability. Thus, a suitable upper limit range of the content of $Al_2O_3$ is 30% or less, 28% or less, 26% or less, 25% or less, 24% or less, 23.5% or less, 23% or less, 22.5% or less, 22% or less, or 21.5% or less, particularly 21% or less.

$B_2O_3$ is a component that lowers the viscosity at high temperature and a density, and increases devitrification resistance. However, when the content of $B_2O_3$ is too large, the ion exchange rate (in particular, depth of layer) is liable to lower. In addition, coloring on the surface of the glass called weathering may occur through ion exchange, and acid resistance and water resistance are liable to lower. Thus, a suitable range of the content of $B_2O_3$ is from 0% to 3%, from 0% to 2.5%, from 0% to 2%, from 0% to 1.9%, from 0% to 1.8%, from 0% to 1.7%, from 0% to 1.6%, from 0% to 1.5%, or from 0% to 1.3%, particularly from 0% to less than 1%.

$Na_2O$ is an ion exchange component, and is also a component that lowers the viscosity at high temperature to increase the meltability and the formability. In addition, $Na_2O$ is also a component that improves the devitrification resistance, including resistance to devitrification through a reaction with a forming body refractory, in particular, an alumina refractory. When the content of $Na_2O$ is too small, the meltability lowers, the thermal expansion coefficient lowers excessively, and the ion exchange rate is liable to lower. Thus, a suitable lower limit range of the content of $Na_2O$ is 5% or more, 7% or more, 8% or more, 8.5% or more, 9% or more, 9.5% or more, 10% or more, 11% or more, or 12% or more, particularly 12.5% or more. Meanwhile, when the content of $Na_2O$ is too large, the viscosity at which phase separation occurs is liable to lower. In addition, the acid resistance lowers, and the glass composition loses its component balance, with the result that the devitrification resistance lowers contrarily in some cases. Thus, a suitable upper limit range of the content of $Na_2O$ is 22% or less, 20% or less, 19.5% or less, 19% or less, 18% or less, 17% or less, 16.5% or less, 16% or less, or 15.5% or less, particularly 15% or less.

$K_2O$ is a component that lowers the viscosity at high temperature to increase the meltability and the formability. Further, $K_2O$ is also a component that improves the devitrification resistance, and increases the Vickers hardness. However, when the content of $K_2O$ is too large, the viscosity at which phase separation occurs is liable to lower. In addition, there is a tendency that the acid resistance lowers, and the glass composition loses its component balance, with the result that the devitrification resistance lowers contrarily. Thus, a suitable lower limit range of the content of $K_2O$ is 0% or more, 0.01% or more, 0.02% or more, 0.1% or more, 0.5% or more, 1% or more, 1.5% or more, 2% or more, 2.5% or more, or 3% or more, particularly 3.5% or more, and a suitable upper limit range thereof is 5.5% or less, or 5% or less, particularly less than 4.5%.

$Li_2O$ is an ion exchange component, and is also a component that lowers the viscosity at high temperature to increase the meltability and the formability. Further, $Li_2O$ is a component that increases the Young's modulus. A suitable lower limit range of the content of $Li_2O$ is 0% or more, 0.0001% or more, 0.01% or more, 1% or more, 2% or more, 2.5% or more, or 2.8% or more, and a suitable upper limit range of the content of $Li_2O$ is 10% or less, 5% or less, 4.5% or less, 2% or less, 1% or less, less than 1%, 0.5% or less, 0.3% or less, 0.1% or less, or 0.05% or less.

MgO is a component that lowers the viscosity at high temperature to increase the meltability and the formability. In addition, MgO is also a component that increases the Young's modulus to increase the Vickers hardness, and increases the acid resistance. Thus, a suitable lower limit range of the content of MgO is 0% or more, 0.1% or more, 0.5% or more, 1% or more, 1.5% or more, particularly 2% or more. However, when the content of MgO is too large, there is a tendency that the ion exchange rate is liable to lower, and the glass is liable to devitrify. In particular, when a sheet shape is formed by an overflow down-draw method through use of an alumina refractory as a forming body refractory, a devitrified crystal of spinel is liable to be deposited at an interface between the glass and the alumina refractory. Thus, a suitable upper limit range of the content of MgO is 5.5% or less, 4.5% or less, 4% or less, 3.5% or less, or 3% or less, particularly 2.5% or less.

$P_2O_5$ is a component that increases the ion exchange rate while maintaining a compressive stress value. Thus, a suitable lower limit range of the content of $P_2O_5$ is 2% or more, 2.1% or more, 2.5% or more, 3% or more, or 4% or more, particularly 4.5% or more. However, when the content of $P_2O_5$ is too large, white turbidity resulting from phase separation occurs in the glass, and the water resistance is liable to lower. Thus, a suitable upper limit range of the content of $P_2O_5$ is 10% or less, 8.5% or less, 8% or less, 7.5% or less, 7% or less, 6.5% or less, 6.3% or less, 6% or less, 5.9% or less, 5.7% or less, 5.5% or less, 5.3% or less, or 5.1% or less, particularly 5% or less.

As a fining agent, one kind or two or more kinds selected from the group consisting of Cl, $SO_3$, and $CeO_2$ (preferably the group consisting of Cl and $SO_3$) may be added at from 0% to 3%.

$SnO_2$ has an effect of enhancing the ion exchange performance. Thus, the content of $SnO_2$ is preferably from 0% to 3%, from 0.01% to 3%, from 0.05% to 3%, particularly from 0.1% to 3%, particularly preferably from 0.2% to 3%.

The content of $Fe_2O_3$ is preferably less than 1,000 ppm (less than 0.10), less than 800 ppm, less than 600 ppm, or less than 400 ppm, particularly preferably less than 300 ppm. With this configuration, the transmittance (400 nm to 770 nm) of glass having a thickness of 1 mm is easily improved.

A rare earth oxide, such as $Nb_2O_5$ or $La_2O_3$, is a component that enhances the Young's modulus. However, the cost of the raw material itself is high, and when the rare earth oxide is added in a large amount, the devitrification resistance is liable to lower. Thus, the content of the rare earth oxide is preferably 3% or less, 2% or less, 1% or less, or 0.5% or less, particularly preferably 0.1% or less.

In addition, it is preferred that the glass to be tempered be substantially free of $As_2O_3$, $Sb_2O_3$, and PbO as a glass composition from the standpoint of environmental considerations. In addition, it is also preferred that the glass to be tempered be substantially free of $Bi_2O_3$ and F from the standpoint of environmental considerations.

It is more preferred that the glass to be tempered comprise as a glass composition, in terms of mass %, 40% to 70% of $SiO_2$, 10% to 30% of $Al_2O_3$, 0.1% to 3% of $B_2O_3$, 5% to 25% of $Na_2O$, 1% to 5.5% of $K_2O$, 0.01% to 10% of $Li_2O$, 0.1% to 5.5% of MgO, 2% to 10% of $P_2O_5$, and 0.01% to 3% of $SnO_2$.

The composition of the glass to be tempered described above is an example, and a glass to be tempered having a known composition may be used as long as the glass can be chemically tempered by ion exchange. In addition, the composition of the tempered glass to be obtained by subjecting the above-mentioned glass to be tempered to ion exchange treatment is similar to the composition of the glass to be tempered before the ion exchange treatment.

The glass to be tempered may be produced as described below.

First, glass raw materials, which have been blended so as to have the above-mentioned glass composition, are loaded in a continuous melting furnace, are melted by heating at from 1,500° C. to 1,600° C., and are fined. After that, the resultant is fed to a forming apparatus, is formed into, for example, a sheet shape, and is annealed. Thus, the glass to be tempered can be produced.

An overflow down-draw method is preferably adopted as a method of forming the glass sheet. The overflow down-draw method is a method by which a high-quality glass sheet can be produced in a large amount, and by which even a large-size glass sheet can be easily produced. In addition, the method allows scratches on the surface of the glass sheet to be reduced to the extent possible. In the overflow down-draw method, alumina or dense zircon is used as a forming body. The glass to be tempered according to the present invention has satisfactory compatibility with alumina or dense zircon, in particular, alumina (hardly produces bubbles, stones, and the like through a reaction with the forming body).

Various forming methods other than the overflow down-draw method may also be adopted. For example, forming methods such as a float method, a down draw method (such as a slot down method or a re-draw method), a roll out method, and a press method may be adopted.

Bending processing may be performed as required after the forming of the glass to be tempered, or simultaneously with the forming. In addition, processing such as cutting processing, boring processing, surface polishing processing, chamfering processing, end surface polishing processing, or etching processing may be performed as required.

The dimensions of the glass to be tempered may be arbitrarily set, but the thickness T is preferably 2.0 mm or less, more preferably 1.0 mm or less, still more preferably from 0.3 mm to 0.9 mm.

Figure 3:
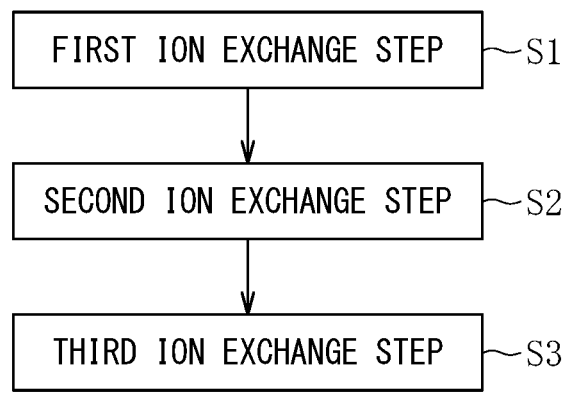
FIG. 3 is a flowchart of a method of producing the tempered glass according to the first embodiment of the present invention.

The glass to be tempered obtained as described above is subjected to the ion exchange treatment a plurality of times. In this embodiment, description is given by taking a case in which the ion exchange treatment is performed three times as an example. Specifically, in a method of producing the tempered glass according to this embodiment, as illustrated in FIG. 3, a first ion exchange step S1, a second ion exchange step S2, and a third ion exchange step S3 are performed in the stated order. Although not shown in the drawings, in the following, molten salts and alkali metal ions to be used in the steps S1 to S3 are also denoted by reference signs so as to be distinguished from each other.

In the first ion exchange step S1, the ion exchange treatment of the surface of the glass to be tempered is performed by: immersing the glass to be tempered in a treatment tank filled with a first molten salt containing a second alkali metal ion a2 having a larger ionic radius than a first alkali metal ion a1 contained in the glass to be tempered; and holding the glass to be tempered at a predetermined temperature for a predetermined time. Thus, the first alkali metal ion a1 contained in the glass to be tempered and the second alkali metal ion a2 contained in the first molten salt m1 are subjected to ion exchange to introduce the second alkali metal ion a2 to a depth of 10.5% or more of the thickness T from the surface (in this embodiment, main surfaces and end surfaces) of the glass to be tempered. As a result, a compressive stress layer is formed in a surface layer portion of the glass to be tempered, and thus the glass to be tempered is tempered.

In the first ion exchange step S1, the first alkali metal ion a1 is a desorbed ion to be desorbed from the glass to be tempered, and the second alkali metal ion a2 is an introduced ion to be introduced into the glass to be tempered.

In the first ion exchange step S1, a region in which the second alkali metal ion a2 is introduced into the glass to be tempered is preferably a region ranging from the surface of the glass to be tempered to a depth of 12% or more of the thickness T, more preferably a region ranging from the surface of the glass to be tempered to a depth of 13.5% or more and 30% or less of the thickness T.

The first molten salt m1 comprises, as a main component, a mixed salt of: the nitrate of a first alkali metal ion a1 that is incorporated in advance into the composition of the glass to be tempered, and that is desorbed in the ion exchange; and the nitrate of a second alkali metal ion a2 introduced into the glass to be tempered by the ion exchange. In this embodiment, a case in which the first alkali metal ion a1 is a Na ion and the second alkali metal ion a2 is a K ion is described. That is, in this embodiment, the first molten salt m1 is a mixed salt comprising $NaNO_3$ and $KNO_3$ as main components. The first molten salt m1 is not limited thereto, and may be, for example, a molten salt formed only of $KNO_3$.

A $KNO_3$ concentration in the first molten salt m1 is preferably higher than a $NaNO_3$ concentration in the first molten salt m1. Specifically, the $NaNO_3$ concentration is preferably less than 50 mass %, more preferably from 5 mass % to 40 mass %. The $KNO_3$ concentration is preferably 50 mass % or more, more preferably from 60 mass % to 95 mass %.

In the second ion exchange step S2, the ion exchange treatment of the surface of the glass to be tempered is performed by: immersing the glass to be tempered that has been subjected to the first ion exchange step S1 in a treatment tank filled with a second molten salt m2 containing the first alkali metal ion a1; and holding the glass to be tempered at a predetermined temperature for a predetermined time. Thus, the second alkali metal ion a2 contained in the glass to be tempered and the first alkali metal ion a1 contained in the second molten salt m2 are subjected to ion exchange to desorb, from the glass to be tempered, at least part the second alkali metal ion a2 in a region ranging from the surface (in this embodiment, main surfaces and end surfaces) of the glass to be tempered and being shallower than 10% of the thickness T. As a result, the compressive stress of the compressive stress layer formed in the glass to be tempered is reduced. Meanwhile, a region in which the compressive stress layer is formed expands to a deep site in the glass to be tempered.

In the second ion exchange step S2, the second alkali metal ion a2 is a desorbed ion to be desorbed from the glass to be tempered, and the first alkali metal ion a1 is an introduced ion to be introduced into the glass to be tempered.

In the second ion exchange step S2, a region in which the second alkali metal ion a1 is desorbed from the glass to be tempered is preferably a region ranging from the surface of the glass to be tempered to a depth of 9% or less of the thickness T, more preferably a region ranging from the surface of the glass to be tempered to a depth of 4% or more and 8% or less of the thickness T.

The second molten salt m2 comprises, as a main component, a mixed salt of: the nitrate of a second alkali metal ion a2 that is incorporated in advance into the composition of the glass to be tempered, and that is desorbed in the ion exchange; and the nitrate of a first alkali metal ion a1 introduced into the glass to be tempered by the ion exchange. That is, in this embodiment, the second molten salt m2 is a mixed salt comprising $NaNO_3$ and $KNO_3$ as main components. The second molten salt m2 is not limited thereto, and may be, for example, a molten salt formed only of $NaNO_3$.

A $NaNO_3$ concentration in the second molten salt m2 is preferably higher than a $KNO_3$ concentration in the second molten salt m2. Specifically, the $NaNO_3$ concentration is preferably 60 mass % or more, more preferably from 70 mass % to 95 mass %. The $KNO_3$ concentration is preferably 40 mass % or less, more preferably from 5 mass % to 30 mass %.

In the third ion exchange step S3, the ion exchange treatment of the surface of the glass to be tempered is performed by: immersing the glass to be tempered that has been subjected to the second ion exchange step S2 in a treatment tank filled with a third molten salt m3 containing the second alkali metal ion a2; and holding the glass to be tempered at a predetermined temperature for a predetermined time. Thus, the first alkali metal ion a1 contained in the glass to be tempered and the second alkali metal ion a2 contained in the first molten salt m1 are subjected to ion exchange to introduce the second alkali metal ion a2 to a region ranging from the surface (in this embodiment, main surfaces and end surfaces) of the glass to be tempered and being shallower than 7% of the thickness T. As a result, the glass to be tempered is tempered again, and the compressive stress layer 2 having a high compressive stress can be formed in the vicinity of the surface in the surface layer portion. At this time, the compressive stress layer 2 is maintained in a state of expanding to some degree of depth.

In the third ion exchange step S3, the first alkali metal ion a1 is a desorbed ion to be desorbed from the glass to be tempered, and the second alkali metal ion a2 is an introduced ion to be introduced into the glass to be tempered.

In the third ion exchange step S3, a region in which the second alkali metal ion a2 is introduced into the glass to be tempered is preferably a region ranging from the surface of the glass to be tempered to a depth of 6% or less of the thickness T, more preferably a region ranging from the surface of the glass to be tempered to a depth of 1% or more and 5% or less of the thickness T.

A $KNO_3$ concentration in the third molten salt m3 is preferably higher than a $NaNO_3$ concentration in the third molten salt m3.

The $NaNO_3$ concentration in the third molten salt m3 is preferably lower than the $NaNO_3$ concentration in the first molten salt m1. Specifically, the $NaNO_3$ concentration in the third molten salt m3 is preferably 10 mass % or less, more preferably from 0 mass % to 5 mass %, still more preferably from 0.1 mass % to 5 mass %.

The $KNO_3$ concentration in the third molten salt m3 is preferably higher than the $KNO_3$ concentration in the first molten salt m1. Specifically, the $KNO_3$ concentration in the third molten salt m3 is preferably 90 mass % or more, more preferably from 95 mass % to 100 mass %, still more preferably from 95 mass % to 99.5 mass %.

In this embodiment, the third molten salt m3 is a molten salt formed only of $KNO_3$. However, the third molten salt m3 is not limited thereto, and may be, for example, a mixed salt containing $NaNO_3$ and $KNO_3$ as main components.

The content ratio of an alkali metal ion having a small ionic radius (e.g., a Li ion or a Na ion, in particular, a Na ion) in the third molten salt m3 is preferably smaller than that in the first molten salt m1. With this configuration, it becomes easier to increase the concentration of a large alkali metal ion in the outermost surface while increasing the depth of layer. The sizes of alkali metal ions satisfy the following relationship: Li ion<Na ion<K ion (potassium ion)<Ce ion<Rb ion.

An ion exchange treatment temperature in the first ion exchange step S1 and an ion exchange treatment temperature in the second ion exchange step S2 are preferably higher than an ion exchange treatment temperature in the third ion exchange step S3. The ion exchange treatment temperature means the temperature of the molten salt.

Specifically, the ion exchange treatment temperature in each of the first ion exchange step S1 and the second ion exchange step S2 is preferably 420° C. or more, more preferably 430° C. or more, still more preferably from 440° C. to 500° C. The ion exchange treatment temperature in the first ion exchange step S1 is preferably higher than the ion exchange treatment temperature in the second ion exchange step S2. A difference between the ion exchange treatment temperatures in the first ion exchange step S1 and the second ion exchange step S2 is preferably 5° C. or more, more preferably from 5° C. to 50° C. The ion exchange treatment temperature in the first ion exchange step S1 is more preferably from 440° C. to less than 490° C., still more preferably from 450° C. to 470° C. The ion exchange treatment temperature in the second ion exchange step S2 is more preferably from 400° C. to 480° C., still more preferably from 420° C. to 460° C.

An ion exchange treatment temperature in the third ion exchange step S3 is lower than the ion exchange treatment temperature in the first ion exchange step S1 by preferably 10° C. or more, 20° C. or more, 30° C. or more, or 30° C. or more, particularly preferably 50° C. or more. Specifically, the ion exchange treatment temperature in the third ion exchange step S3 is preferably from 350° C. to less than 410° C. or from 360° C. to less than 400° C., particularly preferably from 380° C. to less than 400° C.

Anion exchange treatment time in each of the first ion exchange step S1 and the second ion exchange step S2 is preferably 3 or more times, more preferably 5 or more times, still more preferably from 10 times to 200 times as long as an ion exchange treatment time in the third ion exchange step S3.

The ion exchange treatment time in each of the first ion exchange step S1 and the second ion exchange step S2 is preferably 2 hours or more, more preferably 3 hours or more, still more preferably from 4 hours to 20 hours. When the ion exchange treatment times in the first ion exchange step S1 and the second ion exchange step S2 are lengthened, the compressive stress layer can be formed so as to be deep. Accordingly, the treatment times are preferably lengthened to the extent that productivity does not lower. The ion exchange treatment time in the first ion exchange step S1 is preferably longer than the ion exchange treatment time in the second ion exchange step S2. A difference between the ion exchange treatment times in the first ion exchange step S1 and the second ion exchange step S2 is preferably 2 hours or more, more preferably from 3 hours to 7 hours.

The ion exchange treatment time in the third ion exchange step S3 is preferably 2 hours or less, more preferably 3 hours or less, from 0.2 hour to 2 hours, from 0.3 hour to 1 hour, or from 0.3 hour to 0.5 hour. When the total time of the ion exchange treatments is controlled to be short, the tensile stress in the tensile stress layer 3 is easily controlled to a small value.

The glass to be tempered that is immersed in the molten salt in each of the ion exchange steps S1 to S3 may be preheated to the temperature of the molten salt in the ion exchange treatment of each ion exchange step in advance, or may be immersed in each molten salt while being in a normal temperature (e.g., from 1° C. to 40° C.) state.

A washing step of washing the glass to be tempered that has been drawn out of the molten salt is preferably provided between the first ion exchange step S1 and the second ion exchange step S2, and/or between the second ion exchange step S2 and the third ion exchange step S3. When the washing is performed, it becomes easier to remove a deposit adhering to the glass to be tempered, and hence the ion exchange treatment can be more uniformly performed in the second ion exchange step S2 and/or the third ion exchange step S3.

The tempered glass 1 having the above-mentioned characteristics can be obtained by appropriately adjusting the treatment times and the treatment temperatures in the condition ranges of the first to third ion exchange steps S1 to S3 described above.

After the third ion exchange step S3, various kinds of processing, such as cutting processing, boring processing, surface polishing processing, chamfering processing, end surface polishing processing, etching processing, and film formation processing, may each be performed.

In addition, in the above-mentioned embodiment, an example in which the first to third ion exchange steps including two tempering steps and one relaxing step are performed has been described. However, two or four or more ion exchange steps including at least two tempering steps may be performed.

Second Embodiment

Figure 4:
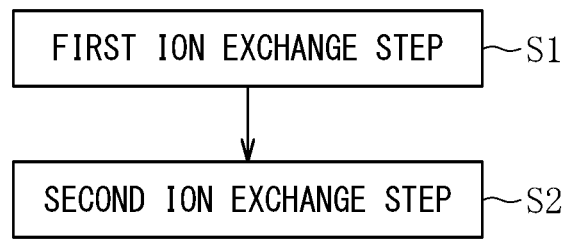
FIG. 4 is a flowchart of a method of producing a tempered glass according to a second embodiment of the present invention.

In the first embodiment, a method by which the tempered glass 1 is obtained through three ion exchange treatments has been given as an example. In a second embodiment, a method by which the tempered glass 1 is obtained through two ion exchange treatments is given as an example. Specifically, in a method of producing the tempered glass according to this embodiment, as illustrated in FIG. 4, a first ion exchange step T1 and a second ion exchange step T2 are performed in the stated order. Although not shown in the drawings, in the following, molten salts and alkali metal ions to be used in the steps T1 and T2 are also denoted by reference signs so as to be distinguished from each other.

In the first ion exchange step T1, the ion exchange treatment of the surface of the glass to be tempered is performed by: immersing the glass to be tempered in a treatment tank filled with a first molten salt n1 containing a second alkali metal ion b2 having a larger ionic radius than a first alkali metal ion b1 contained in the glass to be tempered; and holding the glass to be tempered at a predetermined temperature for a predetermined time. Thus, the first alkali metal ion b1 contained in the glass to be tempered and the second alkali metal ion b2 contained in the first molten salt n1 are subjected to ion exchange to introduce the second alkali metal ion b2 in the vicinity of the surface (in this embodiment, main surfaces and end surfaces) of the glass to be tempered. As a result, a compressive stress layer is formed in a surface layer portion of the glass to be tempered, and thus the glass to be tempered is tempered.

In the first ion exchange step T1, the first alkali metal ion b1 is a desorbed ion to be desorbed from the glass to be tempered, and the second alkali metal ion b2 is an introduced ion to be introduced into the glass to be tempered.

In the first ion exchange step T1, a region in which the second alkali metal ion b2 is introduced into the glass to be tempered is preferably a region ranging from the surface of the glass to be tempered to a depth of 10% or more of the thickness T, more preferably a region ranging from the surface of the glass to be tempered to a depth of 12% or more, 14% or more, 15% or more, or 15% or more and 40% or less of the thickness T.

In the second ion exchange step T2, the ion exchange treatment of the surface of the glass to be tempered is performed by: immersing the glass to be tempered in a treatment tank filled with a second molten salt n2 containing a third alkali ion b3, which has a larger ionic radius than the second alkali metal ion b2 contained in the glass to be tempered, and the first alkali metal ion b1; and holding the glass to be tempered at a predetermined temperature for a predetermined time. Thus, the first alkali metal ion b1 is subjected to reverse ion exchange with the second alkali metal ion b2 contained in the glass to be tempered, to desorb at least part of the second alkali metal ion b2 from the glass to be tempered. Simultaneously with this, the third alkali metal ion b3 is subjected to ion exchange with the first alkali metal ion b1 or the second alkali metal ion b2 contained in the glass to be tempered, to introduce the third alkali metal ion b3 into the tempered glass to a region ranging from the surface and being shallower than 7% of the thickness T. That is, while the compressive stress formed in the surface layer portion of the glass to be tempered is relaxed through the reverse ion exchange, the glass to be tempered is tempered through the ion exchange, with the result that a high compressive stress is formed only in the vicinity of the surface in the surface layer portion.

In the second ion exchange step T2, a region in which the second alkali metal ion b2 is desorbed from the glass to be tempered is preferably a region ranging from the surface of the glass to be tempered to a depth of 15% or less of the thickness T, more preferably a region ranging from the surface of the glass to be tempered to a depth of 14% or less, 13% or less, 12% or less, 11% or less, 10% or less, 1% or more and 10% or less, 2% or more and 10% or less, 3% or more and 10% or less, 4% or more and 10% or less, or 5% or more and 10% or less of the thickness T. In addition, in the second ion exchange step T2, a region in which the third alkali metal ion b3 is introduced into the glass to be tempered is preferably a region ranging from the surface of the glass to be tempered to a depth of 7% or less of the thickness T, more preferably a region ranging from the surface of the glass to be tempered to a depth of 6.5% or less, 6% or less, 5.5% or less, or 5% or less of the thickness T.

The tempered glass 1 having the above-mentioned characteristics can be obtained by appropriately adjusting the treatment times and the treatment temperatures in the condition ranges of the first and second ion exchange steps T1 and T2 described above.

In this connection, in the second ion exchange step T2, the rate of the above-mentioned reverse ion exchange is larger than the rate of the above-mentioned ion exchange, and hence the relaxation of the compressive stress in the surface layer portion first progresses to a deep site, and then a compressive stress is formed in the surface again. Accordingly, in the stress profile of the produced tempered glass 1, the first bottom B1 as shown in FIG. 2 is easily formed.

After the second ion exchange step T2, various kinds of processing, such as cutting processing, boring processing, surface polishing processing, chamfering processing, end surface polishing processing, etching processing, and film formation processing, may each be performed.

In the second embodiment, the first alkali metal ion b1 is preferably a Li ion, the second alkali metal ion b2 is preferably a Na ion, and the third alkali metal ion b3 is preferably a K ion.

In particular, when the glass to be tempered is a lithium aluminosilicate glass comprising, in terms of mass %, 2% or more of $Li_2O$ and 5% or more of $Na_2O$, a molten salt formed only of $NaNO_3$ or a mixed salt containing $NaNO_3$ and $KNO_3$ as main components may be used as the first molten salt n1. The first molten salt n1 may contain $LiNO_3$. In this case, the $Li_2O$ content of the glass to be tempered is preferably from 2.5 mass % to 5.0 mass %, more preferably from 2.8 mass % to 4.5 mass %.

In the second embodiment, it is preferred that the glass to be tempered comprise as a glass composition, in terms of mass %, 48% to 60% of $SiO_2$, 21% to 29% of $Al_2O_3$, 0% to 10% of $B_2O_3$, 2% to 11% of $Li_2O$, 5% to 20% of $Na_2O$, 0% to 10% of $K_2O$, 0% to 6% of MgO, 0% to 10% of ZnO, and 0% to 20% of $P_2O_3$.

In the second embodiment, the first molten salt n1 to be used in the first ion exchange step T1 is preferably a mixed salt of $NaNO_3$ and $KNO_3$. The first molten salt n1 containing a K ion is suitable for the control of the quality of the tempered glass to be obtained because it becomes easy to measure the stress of the glass to be tempered and the distribution thereof after the first ion exchange step T1. A $NaNO_3$ concentration in the first molten salt n1 is, in terms of mass %, preferably from 100% to 20%, from 100% to 30%, from 100% to 40%, from 100% to 50%, or from 100% to 60%, and the balance is preferably $KNO_3$. The $NaNO_3$ concentration in the first molten salt n1 is preferably higher than a $KNO_3$ concentration in the first molten salt n1. The first molten salt n1 may be configured to contain only $NaNO_3$, and not to contain $KNO_3$. An ion exchange treatment temperature in the first ion exchange step T1 is preferably from 350° C. to 480° C., more preferably from 360° C. to 430° C., still more preferably from 370° C. to 400° C., or from 370° C. to 390° C. An ion exchange treatment time in the first ion exchange step T1 is preferably from 1 hour to 20 hours, more preferably from 1.5 hours to 15 hours, still more preferably from 2 hours to 10 hours.

In the second embodiment, the second molten salt n2 to be used in the second ion exchange step T2 is preferably a mixed salt of $LiNO_3$ and $KNO_3$. A $LiNO_3$ concentration in the second molten salt n2 is preferably lower than a $KNO_3$ concentration in the second molten salt n2. Specifically, the $LiNO_3$ concentration in the second molten salt n2 is, in terms of mass %, preferably from 0.1% to 5%, from 0.2% to 5%, from 0.3% to 5%, from 0.4% to 5%, from 0.5% to 5%, from 0.5% to 4%, from 0.5% to 3%, from 0.5% to 2.5%, from 0.5% to 2%, or from 1% to 2%, and the balance is preferably $KNO_3$. In addition, a Li ion concentration in the second molten salt is preferably 100 ppm by mass or more. In this case, the Li ion concentration in the second molten salt n2 is determined by multiplying $LiNO_3$ expressed in mass % by 0.101. An ion exchange treatment temperature in the second ion exchange step T2 is preferably from 350° C. to 480° C., more preferably from 360° C. to 430° C., still more preferably from 370° C. to 400° C., or from 370° C. to 390° C. An ion exchange treatment time in the second ion exchange step T2 is preferably shorter than the ion exchange treatment time in the first ion exchange step T1. The ion exchange treatment time in the second ion exchange step T2 is preferably 0.2 hour or more, more preferably from 0.3 hour to 2 hours, or from 0.4 hour to 1.5 hours, still more preferably from 0.5 hour to 1 hour.

Some embodiments of the present invention have been described above. Of course, however, the present invention is not limited to those embodiments, and various other embodiments are possible within the scope of the present invention.

For example, in each of the first and second embodiments described above, an example in which the tempered glass 1 comprises the compressive stress layer 2 on each of both front and back main surface 1a sides and the end surface 1b sides has been described. However, the tempered glass 1 may comprise the compressive stress layer 2 only in part of the surface layer portion thereof, and for example, may comprise the compressive stress layer 2 only on one main surface 1a side. As a method of forming the compressive stress layer 2 only in part of the surface layer portion of the tempered glass 1, there is given, for example, a method comprising: forming in advance a suppressive film (e.g., a $SiO_2$ film), which is configured to suppress the permeation of an introduced ion in ion exchange treatment, in a region of the glass to be tempered in which the compressive stress layer is not to be formed; and locally performing ion exchange treatment on part of the glass to be tempered free of the suppressive film.

In addition, in each of the above-mentioned embodiments, the tempered glass 1 has a flat sheet shape. However, the concept of sheet shape in the present invention also encompasses the form of a curved sheet shape having a curved surface.

EXAMPLES

The tempered glass according to the present invention is hereinafter described based on Examples. The following Examples are merely illustrative. The present invention is by no means limited to these Examples.

A sample was produced as described below. First, glasses to be tempered having compositions A to T shown in Tables 1 and 2 as glass compositions were prepared.

TABLE 1

| Glass | | A | B | C | D | E | F | G | H | I | J |
|---|---|---|---|---|---|---|---|---|---|---|---|
| wt % | SiO$_2$ | 53.59 | 61.69 | 58.2 | 58.9 | 57.2 | 56.6 | 54.7 | 54.5 | 54.0 | 53.4 |
| | Al$_2$O$_3$ | 20 | 18 | 27.4 | 27.7 | 27.5 | 28.7 | 26.8 | 23.2 | 22.5 | 25.0 |
| | B$_2$O$_3$ | 0.5 | 0.5 | | 0.1 | 0.1 | 0.1 | 0.1 | 0.1 | 0.1 | 0.1 |
| | Li$_2$O | 0.01 | 0.01 | 2.9 | 3.8 | 3.8 | 3.3 | 2.8 | 3.4 | 3.5 | 3.5 |
| | Na$_2$O | 13.7 | 14.6 | 10.4 | 7.6 | 8.5 | 8.4 | 8.1 | 6.4 | 7.1 | 6.4 |
| | K$_2$O | 4.4 | 2.0 | | 1.8 | 1.8 | 1.8 | 1.2 | 3.5 | 2.1 | 3.5 |
| | MgO | 2.1 | 3.0 | | | | | | 1.4 | 1.2 | 2.1 |
| | ZnO | | | | | | | | | | |
| | P$_2$O$_5$ | | | 1.0 | | 1.0 | 1.0 | 6.3 | 7.3 | 9.4 | 5.9 |
| | SnO$_2$ | 0.3 | 0.3 | 0.1 | 0.1 | 0.1 | 0.1 | 0.1 | 0.1 | 0.1 | 0.1 |

TABLE 2

| Glass | | K | L | M | N | O | P | Q | R | S | T |
|---|---|---|---|---|---|---|---|---|---|---|---|
| wt % | SiO$_2$ | 53.2 | 54.2 | 53.4 | 53.7 | 52.9 | 52.1 | 54.9 | 56.3 | 57.0 | 51.5 |
| | Al$_2$O$_3$ | 22.4 | 22.6 | 22.5 | 22.4 | 22.3 | 24.4 | 23.4 | 24.0 | 25.2 | 27.9 |
| | B$_2$O$_3$ | 0.1 | 0.1 | 0.1 | 0.1 | 0.1 | 0.1 | 0.1 | | | 0.3 |
| | Li$_2$O | 3.5 | 4.0 | 4.0 | 3.1 | 3.0 | 4.1 | 3.8 | 2.8 | 3.6 | 3.3 |
| | Na$_2$O | 7.1 | 6.2 | 6.2 | 8.0 | 7.9 | 6.2 | 6.0 | 10.2 | 7.5 | 7.5 |
| | K$_2$O | 2.1 | 2.1 | 2.1 | 2.1 | 2.1 | 1.0 | 3.5 | | 0.7 | 0.6 |
| | MgO | 1.2 | 1.2 | 1.2 | 1.2 | 1.2 | 2.4 | 1.4 | | 0.2 | 0.3 |
| | ZnO | | | | | | | | 1.4 | | |
| | P$_2$O$_5$ | 10.4 | 9.4 | 10.4 | 9.4 | 10.3 | 9.5 | 6.8 | 5.2 | 5.7 | 8.4 |
| | SnO$_2$ | 0.1 | 0.1 | 0.1 | 0.1 | 0.1 | 0.1 | 0.1 | 0.1 | 0.1 | 0.1 |

For each composition, glass raw materials were blended, and were melted with a platinum pot at 1,600° C. for 21 hours. After that, the resultant molten glasses were subjected to flow-down forming from a refractory forming body by using an overflow down-draw method to be formed into sheet shapes having predetermined thicknesses shown in Tables 3 to 18.

Next, the glasses to be tempered were subjected to ion exchange treatments by being immersed in molten salt baths under conditions shown in Tables 3 to 18 to provide sheet-shaped tempered glasses. With regard to the molten salt baths, in a step marked with "NaNO$_3$/KNO$_3$", a weight concentration ratio between NaNO$_3$ and KNO$_3$ in a molten salt was adjusted to concentrations shown in the tables by adding a NaNO$_3$ molten salt to a KNO$_3$ molten salt. With regard to the molten salt baths, in a step marked with "LiNO$_3$/KNO$_3$", a weight concentration ratio between LiNO$_3$ and KNO$_3$ in a molten salt was adjusted to concentrations shown in the tables by adding a LiNO$_3$ molten salt to a KNO$_3$ molten salt.

Samples Nos. 1 to 10 were each subjected to a total of three ion exchange treatments, that is, a first ion exchange step (tempering step), a second ion exchange step (relaxing step), and a third ion exchange step (tempering step). Meanwhile, Sample No. 11 was subjected to a total of one ion exchange treatment, that is, only the first ion exchange step (tempering step), and Samples Nos. 12 to 160 were each subjected to a total of two ion exchange treatments, that is, the first ion exchange step (tempering step) and the second ion exchange step (tempering step). Samples Nos. 1 to 10 and Nos. 13 to 160 are Examples of the present invention, and Samples Nos. 11 and 12 are Comparative Examples.

Various characteristics and strength test results of the tempered glasses thus obtained, which were measured as described below, are shown in Tables 3 to 18.

TABLE 3

| | No. | | 1 | 2 | 3 | 4 | 5 | 6 |
|---|---|---|---|---|---|---|---|---|
| | Composition | | A | A | A | A | A | A |
| | Thickness T | μm | 700 | 700 | 700 | 700 | 700 | 700 |
| First ion exchange step | NaNO$_3$/KNO$_3$ | mass % | 33.3/66.7 | 33.3/66.7 | 33.3/66.7 | 20/80 | 20/80 | 20/80 |
| | Treatment temperature | ° C. | 460 | 460 | 460 | 460 | 460 | 460 |
| | Treatment time | h | 9 | 9 | 9 | 9 | 24 | 24 |
| Second ion exchange step | NaNO$_3$/KNO$_3$ | mass % | 80/20 | 80/20 | 80/20 | 80/20 | 70/30 | 65/35 |
| | Treatment temperature | ° C. | 430 | 450 | 450 | 450 | 450 | 450 |
| | Treatment time | h | 9 | 4 | 9 | 4 | 7 | 16 |
| Third ion exchange step | LiNO$_3$/KNO$_3$ | mass % | 0/100 | 0/100 | 0/100 | 0/100 | 0/100 | 0/100 |
| | Treatment temperature | ° C. | 390 | 390 | 390 | 390 | 390 | 390 |
| | Treatment time | h | 0.33 | 0.33 | 0.33 | 0.33 | 0.33 | 0.33 |
| | CSmax | MPa | 855 | 867 | 867 | 772 | 733 | 746 |
| | CTmax | MPa | 42 | 42 | 37 | 56 | 76 | 61 |
| | CTmax · thickness T | MPa · mm | 29 | 30 | 26 | 39 | 53 | 42 |
| | DOLzero | μm | 136 | 127 | 144 | 132 | 177 | 186 |
| | DOLzero/thickness T | % | 19 | 18 | 21 | 19 | 25 | 27 |
| | CSb | MPa | 8.9 | 16.2 | −7.4 | 2.0 | −29.4 | −10.5 |
| | DOLb | μm | 21.9 | 20.3 | 21.5 | 25.5 | 19.1 | 19.6 |

TABLE 3-continued

|  |  |  |  |  |  |  |  |
|---|---|---|---|---|---|---|---|
| DOLb/thickness T | % | 3 | 3 | 3 | 4 | 3 | 3 |
| CSp | MPa | 33 | 46 | 21 | 71 | 60 | 28 |
| DOLp | μm | 69.6 | 61.8 | 81.6 | 67.8 | 91.5 | 104.1 |
| DOLp/thickness T | % | 10 | 9 | 12 | 10 | 13 | 15 |
| CSp − CSb | MPa | 24.0 | 29.8 | 28.0 | 69.5 | 89.7 | 38.5 |
| DOLp − DOLb | μm | 47.7 | 41.5 | 60.1 | 42.3 | 72.4 | 84.5 |
| (DOLp − DOLb)/thickness T | % | 7 | 6 | 9 | 6 | 10 | 12 |
| (CSp − CSb)/(DOLp − DOLb) | MPa/μm | 0.5 | 0.7 | 0.5 | 1.6 | 1.2 | 0.5 |
| Simulated casing drop strength | P180 | 153 | 169 | 130 | 197 | Unmeasured | Unmeasured |
|  | P120 | 47 | 51 | 50 | 48 | Unmeasured | Unmeasured |
|  | P100 | Unmeasured | Unmeasured | Unmeasured | 25 | Unmeasured | Unmeasured |
|  | P80 | Unmeasured | Unmeasured | Unmeasured | <20 | Unmeasured | Unmeasured |
| Calculated strength | P180 | 80 | 91 | 67 | 110 | — | — |
|  | P120 | 62 | 64 | 56 | 81 | — | — |
|  | P100 | 48 | 47 | 46 | 56 | — | — |
|  | P80 | −4 | −8 | 4 | −18 | — | — |

| No. |  |  | 7 | 8 | 9 | 10 | 11 | 12 |
|---|---|---|---|---|---|---|---|---|
|  | Composition |  | A | A | A | A | B | B |
|  | Thickness T | μm | 700 | 700 | 700 | 700 | 700 | 800 |
| First ion exchange step | NaNO$_3$/KNO$_3$ | mass % | 20/80 | 0/100 | 33.3/66.7 | 20/80 | 1.9/98.1 | 29.6/70.4 |
|  | Treatment temperature | °C. | 460 | 460 | 460 | 460 | 430 | 490 |
|  | Treatment time | h | 24 | 2 | 24 | 24 | 3 | 18.5 |
| Second ion exchange step | NaNO$_3$/KNO$_3$ | mass % | 65/35 | 100/0 | 68/32 | 60/40 | — | 0/100 |
|  | Treatment temperature | °C. | 450 | 410 | 450 | 450 | — | 390 |
|  | Treatment time | h | 18 | 4 | 9 | 18 | — | 1 |
| Third ion exchange step | LiNO$_3$/KNO$_3$ | mass % | 0/100 | 0/100 | 0/100 | 0/100 | — | — |
|  | Treatment temperature | °C. | 390 | 390 | 390 | 390 | — | — |
|  | Treatment time | h | 0.33 | 0.33 | 0.33 | 0.33 | — | — |
|  | CSmax | MPa | 741 | 741 | 919 | 763 | 842 | 812 |
|  | CTmax | MPa | 57 | 44 | 55 | 64 | 35.8 | 101.8 |
|  | CTmax · thickness T | MPa · mm | 40 | 31 | 39 | 45 | — | — |
|  | DOLzero | μm | 186 | 92 | 171 | 181 | 36 | 102 |
|  | DOLzero/thickness T | % | 27 | 13 | 24 | 26 | 5 | 13 |
|  | CSb | MPa | −17.7 | 55.7 | −5.0 | −2.3 | — | — |
|  | DOLb | μm | 21 | 12 | 17.1 | 19.5 | — | — |
|  | DOLb/thickness T | % | 3 | 2 | 2 | 3 | — | — |
|  | CSp | MPa | 26 | 156 | 32 | 26 | — | — |
|  | DOLp | μm | 107.6 | 37 | 91.6 | 99.5 | — | — |
|  | DOLp/thickness T | % | 15 | 5 | 13 | 14 | — | — |
|  | CSp − CSb | MPa | 44.1 | 100.3 | 36.8 | 28.4 | 39 | 76 |
|  | DOLp − DOLb | μm | 86.6 | 25.0 | 74.5 | 80.0 | <20 | <20 |
|  | (DOLp − DOLb)/thickness T | % | 12 | 4 | 11 | 11 | — | — |
|  | (CSp − CSb)/(DOLp − DOLb) | MPa/μm | 0.5 | 4.0 | 0.5 | 0.4 | — | — |
|  | Simulated casing drop strength | P180 | Unmeasured | Unmeasured | 154 | 167 | 39 | 76 |
|  |  | P120 | Unmeasured | Unmeasured | 52 | 53 | <20 | <20 |
|  |  | P100 | Unmeasured | Unmeasured | Unmeasured | 45 | Unmeasured | Unmeasured |
|  |  | P80 | Unmeasured | Unmeasured | Unmeasured | 45 | Unmeasured | Unmeasured |
|  | Calculated strength | P180 | — | — | 76 | 70 | 32 | — |
|  |  | P120 | — | — | 68 | 64 | 5 | — |
|  |  | P100 | — | — | 59 | 57 | 3 | — |
|  |  | P80 | — | — | 7 | 12 | −15 | — |

TABLE 4

| No. |  |  | 13 | 14 | 15 | 16 | 17 | 18 |
|---|---|---|---|---|---|---|---|---|
|  | Composition |  | C | C | D | D | D | D |
|  | Thickness T | μm | 700 | 700 | 700 | 700 | 700 | 700 |
| First ion exchange step | NaNO$_3$/KNO$_3$ | mass % | 100/0 | 80/20 | 100/0 | 100/0 | 100/0 | 100/0 |
|  | Treatment temperature | °C. | 380 | 380 | 380 | 380 | 380 | 380 |
|  | Treatment time | h | 3 | 6 | 3 | 3 | 3 | 3 |
| Second ion exchange step | LiNO$_3$/KNO$_3$ | mass % | 1.5/98.5 | 1.5/98.5 | 1.5/98.5 | 1.5/98.5 | 1.5/98.5 | 1.7/98.3 |
|  | Treatment temperature | °C. | 380 | 380 | 380 | 380 | 380 | 380 |
|  | Treatment time | min. | 60 | 90 | 60 | 75 | 90 | 90 |
|  | CSmax | MPa | 863 | 799 | 511 | 743 | 856 | 769 |
|  | CTmax | MPa | 37 | 33 | 64 | 58 | 53 | 46 |
|  | CTmax · thickness T | MPa · mm | 26 | 23 | 45 | 41 | 37 | 33 |
|  | DOLzero | μm | 170 | 155 | 146 | 157 | 160 | 164 |
|  | DOLzero/thickness T | % | 24 | 22 | 21 | 22 | 23 | 23 |
|  | CSb | MPa | −35 | −26 | 47 | 39 | 28 | 22 |
|  | DOLb | μm | 15 | 19 | 25 | 38 | 41 | 42 |

TABLE 4-continued

| | | | | | | | |
|---|---|---|---|---|---|---|---|
| DOLb/thickness T | % | 2 | 3 | 4 | 5 | 6 | 6 |
| CSp | MPa | 28 | 25 | 62 | 51 | 42 | 36 |
| DOLp | μm | 97 | 88 | 61 | 76 | 87 | 98 |
| DOLp/thickness T | % | 14 | 13 | 9 | 11 | 12 | 14 |
| CSp − CSb | MPa | 63 | 51 | 15 | 12 | 14 | 14 |
| DOLp − DOLb | μm | 81 | 69 | 36 | 38 | 46 | 56 |
| (DOLp − DOLb)/thickness T | % | 12 | 10 | 5 | 5 | 7 | 8 |
| (CSp − CSb)/(DOLp − DOLb) | MPa/μm | 0.8 | 0.7 | 0.4 | 0.3 | 0.3 | 0.2 |
| Simulated casing drop strength P180 | | Unmeasured | Unmeasured | Unmeasured | Unmeasured | Unmeasured | Unmeasured |
| P120 | | Unmeasured | Unmeasured | Unmeasured | Unmeasured | Unmeasured | Unmeasured |
| P100 | | Unmeasured | Unmeasured | Unmeasured | Unmeasured | Unmeasured | Unmeasured |
| P80 | | Unmeasured | Unmeasured | Unmeasured | Unmeasured | Unmeasured | Unmeasured |
| Calculated strength P180 | | — | — | 108 | 98 | 87 | 80 |
| P120 | | — | — | 82 | 81 | 76 | 72 |
| P100 | | — | — | 62 | 65 | 62 | 61 |
| P80 | | — | — | −12 | −4 | 0 | 3 |

| | | | No. | 19 | 20 | 21 | 22 |
|---|---|---|---|---|---|---|---|
| | | Composition | | D | D | D | D |
| | | Thickness T | μm | 700 | 700 | 700 | 700 |
| First ion exchange step | NaNO$_3$/KNO$_3$ | | mass % | 100/0 | 100/0 | 90/10 | 85/15 |
| | Treatment temperature | | °C. | 380 | 380 | 380 | 380 |
| | Treatment time | | h | 3 | 6 | 6 | 6 |
| Second ion exchange step | LiNO$_3$/KNO$_3$ | | mass % | 1.5/98.5 | 1.5/98.5 | 1.5/98.5 | 1.5/98.5 |
| | Treatment temperature | | °C. | 380 | 380 | 380 | 380 |
| | Treatment time | | min. | 105 | 90 | 90 | 90 |
| | CSmax | | MPa | 778 | 816 | 739 | 725 |
| | CTmax | | MPa | 52 | 61 | 62 | 66 |
| | CTmax · thickness T | | MPa · mm | 36 | 43 | 43 | 46 |
| | DOLzero | | μm | 167 | 167 | 166 | 164 |
| | DOLzero/thickness T | | % | 24 | 24 | 24 | 23 |
| | CSb | | MPa | 10 | 11 | 17 | −10 |
| | DOLb | | μm | 16 | 16 | 14 | 17 |
| | DOLb/thickness T | | % | 2 | 2 | 2 | 2 |
| | CSp | | MPa | 32 | 45 | 50 | 56 |
| | DOLp | | μm | 83 | 80 | 76 | 77 |
| | DOLp/thickness T | | % | 12 | 11 | 11 | 11 |
| | CSp − CSb | | MPa | 23 | 34 | 33 | 66 |
| | DOLp − DOLb | | μm | 67 | 64 | 62 | 60 |
| | (DOLp − DOLb)/thickness T | | % | 10 | 9 | 9 | 9 |
| | (CSp − CSb)/(DOLp − DOLb) | | MPa/μm | 0.3 | 0.5 | 0.5 | 1.1 |
| | Simulated casing drop strength | P180 | | Unmeasured | Unmeasured | Unmeasured | Unmeasured |
| | | P120 | | Unmeasured | Unmeasured | Unmeasured | Unmeasured |
| | | P100 | | Unmeasured | Unmeasured | Unmeasured | Unmeasured |
| | | P80 | | Unmeasured | Unmeasured | Unmeasured | Unmeasured |
| | Calculated strength | P180 | | 80 | 91 | 97 | 98 |
| | | P120 | | 68 | 78 | 82 | 85 |
| | | P100 | | 58 | 65 | 68 | 69 |
| | | P80 | | 6 | 2 | 1 | 1 |

TABLE 5

| | | No. | 23 | 24 | 25 | 26 | 27 | 28 |
|---|---|---|---|---|---|---|---|---|
| | Composition | | D | D | E | E | E | E |
| | Thickness T | μm | 700 | 700 | 700 | 700 | 700 | 700 |
| First ion exchange step | NaNO$_3$/KNO$_3$ | mass % | 80/20 | 75/25 | 100/0 | 100/0 | 100/0 | 100/0 |
| | Treatment temperature | °C. | 380 | 380 | 380 | 380 | 380 | 380 |
| | Treatment time | h | 6 | 6 | 3 | 3 | 3 | 3 |
| Second ion exchange step | LiNO$_3$/KNO$_3$ | mass % | 1.5/98.5 | 1.5/98.5 | 1.5/98.5 | 1.5/98.5 | 1.5/98.5 | 1.7/98.3 |
| | Treatment temperature | °C. | 380 | 380 | 380 | 380 | 380 | 380 |
| | Treatment time | min. | 90 | 90 | 60 | 75 | 90 | 90 |
| | CSmax | MPa | 719 | 699 | 803 | 803 | 788 | 766 |
| | CTmax | MPa | 53 | 60 | 53 | 52 | 50 | 45 |

TABLE 5-continued

|  |  |  |  |  |  |  |  |
|---|---|---|---|---|---|---|---|
| CTmax · thickness T | MPa · mm | 37 | 42 | 37 | 36 | 35 | 32 |
| DOLzero | μm | 161 | 160 | 151 | 158 | 164 | 168 |
| DOLzero/thickness T | % | 23 | 23 | 22 | 23 | 23 | 24 |
| CSb | MPa | 8 | 20 | 21 | 23 | 19 | 13 |
| DOLb | μm | 16 | 18 | 14 | 26 | 28 | 27 |
| DOLb/thickness T | % | 2 | 2 | 2 | 4 | 4 | 4 |
| CSp | MPa | 43 | 52 | 54 | 43 | 36 | 35 |
| DOLp | μm | 77 | 74 | 68 | 75 | 85 | 90 |
| DOLp/thickness T | % | 11 | 11 | 10 | 11 | 12 | 13 |
| CSp − CSb | MPa | 35 | 32 | 33 | 20 | 16 | 22 |
| DOLp − DOLb | μm | 61 | 56 | 54 | 49 | 57 | 62 |
| (DOLp − DOLb)/thickness T | % | 9 | 8 | 8 | 7 | 8 | 9 |
| (CSp − CSb)/(DOLp − DOLb) | MPa/μm | 0.6 | 0.6 | 0.6 | 0.4 | 0.3 | 0.4 |
| Simulated casing drop strength | P180 | Unmeasured | Unmeasured | Unmeasured | Unmeasured | Unmeasured | Unmeasured |
|  | P120 | Unmeasured | Unmeasured | Unmeasured | Unmeasured | Unmeasured | Unmeasured |
|  | P100 | Unmeasured | Unmeasured | Unmeasured | Unmeasured | Unmeasured | Unmeasured |
|  | P80 | Unmeasured | Unmeasured | Unmeasured | Unmeasured | Unmeasured | Unmeasured |
| Calculated strength | P180 | 89 | 99 | 101 | 90 | 82 | 78 |
|  | P120 | 75 | 82 | 80 | 75 | 71 | 70 |
|  | P100 | 62 | 66 | 63 | 61 | 60 | 60 |
|  | P80 | 2 | −3 | −6 | 0 | 4 | 7 |

| No. |  |  | 29 | 30 | 31 | 32 |
|---|---|---|---|---|---|---|
| Composition |  |  | E | E | E | E |
| Thickness T |  | μm | 700 | 700 | 700 | 700 |
| First ion exchange step | NaNO₃/KNO₃ | mass % | 100/0 | 100/0 | 90/10 | 85/15 |
|  | Treatment temperature | ° C. | 380 | 380 | 380 | 380 |
|  | Treatment time | h | 3 | 6 | 6 | 6 |
| Second ion exchange step | LiNO₃/KNO₃ | mass % | 1.5/98.5 | 1.5/98.5 | 1.5/98.5 | 1.5/98.5 |
|  | Treatment temperature | ° C. | 380 | 380 | 380 | 380 |
|  | Treatment time | min. | 105 | 90 | 90 | 90 |
| CSmax |  | MPa | 809 | 711 | 706 | 694 |
| CTmax |  | MPa | 43 | 55 | 63 | 56 |
| CTmax · thickness T |  | MPa · mm | 30 | 39 | 44 | 39 |
| DOLzero |  | μm | 167 | 173 | 165 | 166 |
| DOLzero/thickness T |  | % | 24 | 25 | 24 | 24 |
| CSb |  | MPa | 2 | −2 | 5 | −2 |
| DOLb |  | μm | 16 | 14 | 20 | 17 |
| DOLb/thickness T |  | % | 2 | 2 | 3 | 2 |
| CSp |  | MPa | 26 | 41 | 45 | 45 |
| DOLp |  | μm | 93 | 87 | 83 | 84 |
| DOLp/thickness T |  | % | 13 | 12 | 12 | 12 |
| CSp − CSb |  | MPa | 24 | 43 | 40 | 47 |
| DOLp − DOLb |  | μm | 77 | 73 | 63 | 67 |
| (DOLp − DOLb)/thickness T |  | % | 11 | 10 | 9 | 10 |
| (CSp − CSb)/(DOLp − DOLb) |  | MPa/μm | 0.3 | 0.6 | 0.6 | 0.7 |
| Simulated casing drop strength | P180 |  | Unmeasured | Unmeasured | Unmeasured | Unmeasured |
|  | P120 |  | Unmeasured | Unmeasured | Unmeasured | Unmeasured |
|  | P100 |  | Unmeasured | Unmeasured | Unmeasured | Unmeasured |
|  | P80 |  | Unmeasured | Unmeasured | Unmeasured | Unmeasured |
| Calculated strength | P180 |  | 71 | 85 | 89 | 88 |
|  | P120 |  | 63 | 76 | 78 | 78 |
|  | P100 |  | 55 | 65 | 65 | 65 |
|  | P80 |  | 9 | 7 | 0 | 2 |

TABLE 6

| No. |  |  | 33 | 34 | 35 | 36 | 37 | 38 |
|---|---|---|---|---|---|---|---|---|
| Composition |  |  | E | E | F | F | F | F |
| Thickness T |  | μm | 700 | 700 | 700 | 700 | 700 | 700 |
| First ion exchange step | NaNO₃/KNO₃ | mass % | 80/20 | 75/25 | 100/0 | 100/0 | 100/0 | 100/0 |
|  | Treatment temperature | ° C. | 380 | 380 | 380 | 380 | 380 | 380 |
|  | Treatment time | h | 6 | 6 | 3 | 3 | 3 | 3 |

TABLE 6-continued

| | | | | | | | | |
|---|---|---|---|---|---|---|---|---|
| Second ion exchange step | LiNO₃/KNO₃ | mass % | 1.5/98.5 | 1.5/98.5 | 1.5/98.5 | 1.5/98.5 | 1.5/98.5 | 1.7/98.3 |
| | Treatment temperature | ° C. | 380 | 380 | 380 | 380 | 380 | 380 |
| | Treatment time | min. | 90 | 90 | 60 | 75 | 90 | 90 |
| CSmax | | MPa | 719 | 685 | 832 | 859 | 841 | 837 |
| CTmax | | MPa | 53 | 57 | 53 | 52 | 46 | 45 |
| CTmax · thickness T | | MPa · mm | 37 | 40 | 37 | 36 | 32 | 32 |
| DOLzero | | μm | 161 | 157 | 150 | 163 | 159 | 167 |
| DOLzero/thickness T | | % | 23 | 22 | 21 | 23 | 23 | 24 |
| CSb | | MPa | 8 | 9 | 24 | 21 | 15 | 10 |
| DOLb | | μm | 16 | 19 | 15 | 31 | 17 | 40 |
| DOLb/thickness T | | % | 2 | 3 | 2 | 4 | 2 | 6 |
| CSp | | MPa | 43 | 48 | 49 | 37 | 33 | 28 |
| DOLp | | μm | 77 | 78 | 66 | 79 | 86 | 100 |
| DOLp/thickness T | | % | 11 | 11 | 9 | 11 | 12 | 14 |
| CSp − CSb | | MPa | 35 | 39 | 25 | 15 | 17 | 18 |
| DOLp − DOLb | | μm | 61 | 59 | 52 | 48 | 68 | 61 |
| (DOLp − DOLb)/thickness T | | % | 9 | 8 | 7 | 7 | 10 | 9 |
| (CSp − CSb)/(DOLp − DOLb) | | MPa/μm | 0.6 | 0.7 | 0.5 | 0.3 | 0.3 | 0.3 |
| Simulated casing drop strength | P180 | | Unmeasured | Unmeasured | Unmeasured | Unmeasured | Unmeasured | Unmeasured |
| | P120 | | Unmeasured | Unmeasured | Unmeasured | Unmeasured | Unmeasured | Unmeasured |
| | P100 | | Unmeasured | Unmeasured | Unmeasured | Unmeasured | Unmeasured | Unmeasured |
| | P80 | | Unmeasured | Unmeasured | Unmeasured | Unmeasured | Unmeasured | Unmeasured |
| Calculated strength | P180 | | 89 | 93 | 96 | 84 | 79 | 70 |
| | P120 | | 75 | 79 | 76 | 71 | 68 | 64 |
| | P100 | | 62 | 63 | 60 | 59 | 57 | 56 |
| | P80 | | 2 | −4 | −5 | 4 | 3 | 8 |

| | | | No. | 39 | 40 | 41 | 42 |
|---|---|---|---|---|---|---|---|
| | | Composition | | F | F | F | F |
| | Thickness T | | μm | 700 | 700 | 700 | 700 |
| First ion exchange step | NaNO₃/KNO₃ | mass % | | 100/0 | 100/0 | 90/10 | 85/15 |
| | Treatment temperature | ° C. | | 380 | 380 | 380 | 380 |
| | Treatment time | h | | 3 | 6 | 6 | 6 |
| Second ion exchange step | LiNO₃/KNO₃ | mass % | | 1.5/98.5 | 1.5/98.5 | 1.5/98.5 | 1.5/98.5 |
| | Treatment temperature | ° C. | | 380 | 380 | 380 | 380 |
| | Treatment time | min. | | 105 | 90 | 90 | 90 |
| CSmax | | MPa | | 812 | 732 | 754 | 651 |
| CTmax | | MPa | | 47 | 45 | 53 | 53 |
| CTmax · thickness T | | MPa · mm | | 33 | 32 | 37 | 37 |
| DOLzero | | μm | | 161 | 173 | 166 | 168 |
| DOLzero/thickness T | | % | | 23 | 25 | 24 | 24 |
| CSb | | MPa | | 2 | −17 | −2 | 9 |
| DOLb | | μm | | 19 | 17 | 16 | 16 |
| DOLb/thickness T | | % | | 3 | 2 | 2 | 2 |
| CSp | | MPa | | 22 | 31 | 36 | 35 |
| DOLp | | μm | | 86 | 96 | 82 | 81 |
| DOLp/thickness T | | % | | 12 | 14 | 12 | 12 |
| CSp − CSb | | MPa | | 20 | 48 | 37 | 26 |
| DOLp − DOLb | | μm | | 67 | 79 | 66 | 64 |
| (DOLp − DOLb)/thickness T | | % | | 10 | 11 | 9 | 9 |
| (CSp − CSb)/(DOLp − DOLb) | | MPa/μm | | 0.3 | 0.6 | 0.6 | 0.4 |
| Simulated casing drop strength | P180 | | | Unmeasured | Unmeasured | Unmeasured | Unmeasured |
| | P120 | | | Unmeasured | Unmeasured | Unmeasured | Unmeasured |
| | P100 | | | Unmeasured | Unmeasured | Unmeasured | Unmeasured |
| | P80 | | | Unmeasured | Unmeasured | Unmeasured | Unmeasured |
| Calculated strength | P180 | | | 69 | 71 | 81 | 82 |
| | P120 | | | 59 | 67 | 70 | 71 |
| | P100 | | | 51 | 59 | 59 | 60 |
| | P80 | | | 10 | 10 | 6 | 7 |

TABLE 7

| | | No. | 43 | 44 | 45 | 46 | 47 | 48 |
|---|---|---|---|---|---|---|---|---|
| | | Composition | F | F | F | F | G | G |
| | | Thickness T | μm | 700 | 700 | 700 | 700 | 700 | 700 |
| First ion exchange step | NaNO$_3$/ KNO$_3$ | mass % | 80/20 | 75/25 | 75/25 | 75/25 | 75/25 | 100/0 |
| | Treatment temperature | ° C. | 380 | 380 | 410 | 410 | 410 | 380 |
| | Treatment time | h | 6 | 6 | 3 | 3 | 3 | 3 |
| Second ion exchange step | LiNO$_3$/ KNO$_3$ | mass % | 1.5/98.5 | 1.5/98.5 | 1.5/98.5 | 1.5/98.5 | 1.5/98.5 | 1.5/98.5 |
| | Treatment temperature | ° C. | 380 | 380 | 380 | 380 | 380 | 380 |
| | Treatment time | min. | 90 | 90 | 90 | 105 | 90 | 30 |
| | CSmax | MPa | 745 | 735 | 796 | 757 | 692 | 696 |
| | CTmax | MPa | 49 | 50 | 57 | 48 | 47 | 59 |
| | CTmax · thickness T | MPa · mm | 34 | 35 | 40 | 34 | 33 | 41 |
| | DOLzero | μm | 165 | 163 | 168 | 167 | 156 | 156 |
| | DOLzero/thickness T | % | 24 | 23 | 24 | 24 | 22 | 22 |
| | CSb | MPa | −3 | 8 | 15 | −5 | 22 | 54 |
| | DOLb | μm | 18 | 19 | 15 | 19 | 18 | 10 |
| | DOLb/thickness T | % | 3 | 3 | 2 | 3 | 3 | 1 |
| | CSp | MPa | 34 | 33 | 37 | 27 | 29 | 59 |
| | DOLp | μm | 85 | 82 | 78 | 90 | 63 | 42 |
| | DOLp/thickness T | % | 12 | 12 | 11 | 13 | 9 | 6 |
| | CSp − CSb | MPa | 36 | 26 | 23 | 32 | 7 | 5 |
| | DOLp − DOLb | μm | 67 | 63 | 63 | 71 | 45 | 32 |
| | (DOLp − DOLb)/thickness T | % | 10 | 9 | 9 | 10 | 6 | 5 |
| | (CSp − CSb)/(DOLp − DOLb) | MPa/μm | 0.5 | 0.4 | 0.4 | 0.4 | 0.2 | 0.1 |
| Simulated casing drop strength | | P180 | Unmeasured | Unmeasured | Unmeasured | Unmeasured | Unmeasured | Unmeasured |
| | | P120 | Unmeasured | Unmeasured | Unmeasured | Unmeasured | Unmeasured | Unmeasured |
| | | P100 | Unmeasured | Unmeasured | Unmeasured | Unmeasured | Unmeasured | Unmeasured |
| | | P80 | Unmeasured | Unmeasured | Unmeasured | Unmeasured | Unmeasured | Unmeasured |
| Calculated strength | | P180 | 79 | 80 | 85 | 72 | 79 | 104 |
| | | P120 | 69 | 69 | 72 | 64 | 63 | 79 |
| | | P100 | 58 | 58 | 61 | 55 | 53 | 63 |
| | | P80 | 6 | 4 | 6 | 8 | 5 | −1 |

| | | No. | 49 | 50 | 51 | 52 |
|---|---|---|---|---|---|---|
| | | Composition | G | G | G | G |
| | | Thickness T | μm | 700 | 700 | 700 | 700 |
| First ion exchange step | NaNO$_3$/ KNO$_3$ | mass % | 100/0 | 100/0 | 100/0 | 100/0 |
| | Treatment temperature | ° C. | 380 | 380 | 380 | 380 |
| | Treatment time | h | 3 | 3 | 3 | 3 |
| Second ion exchange step | LiNO$_3$/ KNO$_3$ | mass % | 1.5/98.5 | 1.5/98.5 | 1.5/98.5 | 1/99 |
| | Treatment temperature | ° C. | 380 | 380 | 380 | 380 |
| | Treatment time | min. | 45 | 60 | 75 | 45 |
| | CSmax | MPa | 749 | 735 | 779 | 696 |
| | CTmax | MPa | 54 | 42 | 45 | 59 |
| | CTmax · thickness T | MPa · mm | 38 | 29 | 31 | 41 |
| | DOLzero | μm | 146 | 158 | 162 | 156 |
| | DOLzero/thickness T | % | 21 | 23 | 23 | 22 |
| | CSb | MPa | 12 | 13 | 9 | 54 |
| | DOLb | μm | 14 | 17 | 15 | 10 |
| | DOLb/thickness T | % | 2 | 2 | 2 | 1 |
| | CSp | MPa | 48 | 20 | 26 | 59 |
| | DOLp | μm | 55 | 68 | 75 | 42 |
| | DOLp/thickness T | % | 8 | 10 | 11 | 6 |
| | CSp − CSb | MPa | 36 | 7 | 17 | 5 |
| | DOLp − DOLb | μm | 41 | 51 | 61 | 32 |
| | (DOLp − DOLb)/thickness T | % | 6 | 7 | 9 | 5 |
| | (CSp − CSb)/(DOLp − DOLb) | MPa/μm | 0.9 | 0.1 | 0.3 | 0.1 |
| Simulated casing drop strength | | P180 | Unmeasured | Unmeasured | Unmeasured | Unmeasured |
| | | P120 | Unmeasured | Unmeasured | Unmeasured | Unmeasured |
| | | P100 | Unmeasured | Unmeasured | Unmeasured | Unmeasured |
| | | P80 | Unmeasured | Unmeasured | Unmeasured | Unmeasured |

TABLE 7-continued

|  |  |  |  |  |  |
|---|---|---|---|---|---|
| Calculated strength | P180 | 93 | 70 | 75 | 104 |
|  | P120 | 68 | 56 | 62 | 79 |
|  | P100 | 54 | 49 | 53 | 63 |
|  | P80 | 1 | 11 | 9 | −1 |

TABLE 8

| | No. | | 53 | 54 | 55 | 56 | 57 | 58 |
|---|---|---|---|---|---|---|---|---|
| | Composition | | G | G | G | G | G | H |
| | Thickness T | μm | 700 | 700 | 700 | 700 | 700 | 700 |
| First ion exchange step | NaNO$_3$/KNO$_3$ | mass % | 100/0 | 100/0 | 100/0 | 100/0 | 100/0 | 75/25 |
| | Treatment temperature | °C. | 380 | 380 | 380 | 380 | 380 | 420 |
| | Treatment time | h | 3 | 3 | 3 | 3 | 3 | 3 |
| Second ion exchange step | LiNO$_3$/KNO$_3$ | mass % | 1/99 | 1.3/98.7 | 1.3/98.7 | 1/99 | 1/99 | 1.5/98.5 |
| | Treatment temperature | °C. | 380 | 380 | 380 | 360 | 360 | 380 |
| | Treatment time | min. | 90 | 60 | 45 | 120 | 60 | 45 |
| | CSmax | MPa | 791 | 762 | 768 | 797 | 813 | 531 |
| | CTmax | MPa | 55 | 44 | 59 | 52 | 51 | 78 |
| | CTmax · thickness T | MPa · mm | 39 | 31 | 41 | 37 | 36 | 54 |
| | DOLzero | μm | 141 | 153 | 154 | 159 | 144 | 155 |
| | DOLzero/thickness T | % | 20 | 22 | 22 | 23 | 21 | 22 |
| | CSb | MPa | 24 | 33 | 42 | 26 | 47 | 54 |
| | DOLb | μm | 15 | 14 | 15 | 19 | 14 | 12 |
| | DOLb/thickness T | % | 2 | 2 | 2 | 3 | 2 | 2 |
| | CSp | MPa | 52 | 36 | 48 | 27 | 53 | 76 |
| | DOLp | μm | 45 | 45 | 50 | 50 | 48 | 54 |
| | DOLp/thickness T | % | 6 | 6 | 7 | 7 | 7 | 8 |
| | CSp − CSb | MPa | 27 | 3 | 5 | 2 | 7 | 22 |
| | DOLp − DOLb | μm | 30 | 32 | 35 | 31 | 33 | 42 |
| | (DOLp − DOLb)/thickness T | % | 4 | 4 | 5 | 4 | 5 | 6 |
| | (CSp − CSb)/(DOLp − DOLb) | MPa/μm | 0.9 | 0.1 | 0.2 | 0.1 | 0.2 | 0.5 |
| Simulated casing drop strength | P180 | | Unmeasured | Unmeasured | Unmeasured | Unmeasured | Unmeasured | Unmeasured |
| | P120 | | Unmeasured | Unmeasured | Unmeasured | Unmeasured | Unmeasured | Unmeasured |
| | P100 | | Unmeasured | Unmeasured | Unmeasured | Unmeasured | Unmeasured | Unmeasured |
| | P80 | | Unmeasured | Unmeasured | Unmeasured | Unmeasured | Unmeasured | Unmeasured |
| Calculated strength | P180 | | 93 | 84 | 96 | 77 | 99 | 121 |
| | P120 | | 65 | 65 | 73 | 61 | 73 | 91 |
| | P100 | | 52 | 54 | 59 | 52 | 57 | 71 |
| | P80 | | 0 | 4 | −1 | 7 | −6 | −7 |

| | No. | | 59 | 60 | 61 | 62 |
|---|---|---|---|---|---|---|
| | Composition | | H | H | I | I |
| | Thickness T | μm | 670 | 670 | 670 | 680 |
| First ion exchange step | NaNO$_3$/KNO$_3$ | mass % | 75/25 | 75/25 | 75/25 | 75/25 |
| | Treatment temperature | °C. | 420 | 420 | 420 | 420 |
| | Treatment time | h | 3 | 3 | 3 | 3 |
| Second ion exchange step | LiNO$_3$/KNO$_3$ | mass % | 2/98 | 1.5/98.5 | 2/98 | 1.5/98.5 |
| | Treatment temperature | °C. | 380 | 380 | 380 | 380 |
| | Treatment time | min. | 45 | 90 | 45 | 90 |
| | CSmax | MPa | 536 | 584 | 507 | 517 |
| | CTmax | MPa | 67 | 61 | 59 | 59 |
| | CTmax · thickness T | MPa · mm | 45 | 41 | 39 | 40 |
| | DOLzero | μm | 145 | 146 | 151 | 150 |
| | DOLzero/thickness T | % | 22 | 22 | 23 | 22 |
| | CSb | MPa | 67 | 33 | 26 | 17 |
| | DOLb | μm | 11 | 20 | 13 | 15 |

TABLE 8-continued

| | | | | | |
|---|---|---|---|---|---|
| DOLb/thickness T | % | 2 | 3 | 2 | 2 |
| CSp | MPa | 73 | 46 | 52 | 55 |
| DOLp | μm | 39 | 59 | 61 | 55 |
| DOLp/thickness T | % | 6 | 9 | 9 | 8 |
| CSp − CSb | MPa | 6 | 13 | 26 | 38 |
| DOLp − DOLb | μm | 28 | 39 | 47 | 41 |
| (DOLp − DOLb)/thickness T | % | 4 | 6 | 7 | 6 |
| (CSp − CSb)/(DOLp − DOLb) | MPa/μm | 0.2 | 0.3 | 0.5 | 0.9 |
| Simulated casing drop strength P180 | | Unmeasured | Unmeasured | Unmeasured | Unmeasured |
| P120 | | Unmeasured | Unmeasured | Unmeasured | Unmeasured |
| P100 | | Unmeasured | Unmeasured | Unmeasured | Unmeasured |
| P80 | | Unmeasured | Unmeasured | Unmeasured | Unmeasured |
| Calculated strength P180 | | 114 | 94 | 99 | 99 |
| P120 | | 81 | 71 | 76 | 73 |
| P100 | | 62 | 56 | 60 | 58 |
| P80 | | −10 | −5 | −3 | 0 |

TABLE 9

| No. | | | 63 | 64 | 65 | 66 | 67 | 68 |
|---|---|---|---|---|---|---|---|---|
| Composition | | | J | J | J | K | K | K |
| Thickness T | | μm | 680 | 680 | 680 | 680 | 680 | 680 |
| First ion exchange step | NaNO₃/KNO₃ | mass % | 75/25 | 75/25 | 75/25 | 75/25 | 75/25 | 75/25 |
| | Treatment temperature | ° C. | 420 | 420 | 420 | 420 | 420 | 420 |
| | Treatment time | h | 3 | 3 | 3 | 3 | 3 | 3 |
| Second ion exchange step | LiNO₃/KNO₃ | mass % | 1.5/98.5 | 2/98 | 1.5/98.5 | 1.5/98.5 | 2/98 | 1.5/98.5 |
| | Treatment temperature | ° C. | 380 | 380 | 380 | 380 | 380 | 380 |
| | Treatment time | min. | 45 | 45 | 90 | 45 | 45 | 90 |
| CSmax | | MPa | 561 | 528 | 604 | 531 | 517 | 594 |
| CTmax | | MPa | 76 | 74 | 66 | 66 | 59 | 55 |
| CTmax · thickness T | | MPa · mm | 52 | 50 | 45 | 45 | 40 | 38 |
| DOLzero | | μm | 145 | 146 | 150 | 146 | 150 | 148 |
| DOLzero/thickness T | | % | 21 | 22 | 22 | 21 | 22 | 22 |
| CSb | | MPa | 63 | 24 | 46 | 54 | 17 | 23 |
| DOLb | | μm | 8 | 9 | 14 | 12 | 15 | 19 |
| DOLb/thickness T | | % | 1 | 1 | 2 | 2 | 2 | 3 |
| CSp | | MPa | 97 | 95 | 61 | 67 | 55 | 32 |
| DOLp | | μm | 42 | 44 | 53 | 41 | 55 | 57 |
| DOLp/thickness T | | % | 6 | 6 | 8 | 6 | 8 | 8 |
| CSp − CSb | | MPa | 34 | 71 | 15 | 13 | 38 | 9 |
| DOLp − DOLb | | μm | 34 | 35 | 38 | 28 | 41 | 38 |
| (DOLp − DOLb)/thickness T | | % | 5 | 5 | 6 | 4 | 6 | 6 |
| (CSp − CSb)/(DOLp − DOLb) | | MPa/μm | 1.0 | 2.1 | 0.4 | 0.5 | 0.9 | 0.2 |
| Simulated casing drop strength | P180 | | Unmeasured | Unmeasured | Unmeasured | Unmeasured | Unmeasured | Unmeasured |
| | P120 | | Unmeasured | Unmeasured | Unmeasured | Unmeasured | Unmeasured | Unmeasured |
| | P100 | | Unmeasured | Unmeasured | Unmeasured | Unmeasured | Unmeasured | Unmeasured |
| | P80 | | Unmeasured | Unmeasured | Unmeasured | Unmeasured | Unmeasured | Unmeasured |
| Calculated strength | P180 | | 130 | 127 | 107 | 106 | 99 | 80 |
| | P120 | | 88 | 86 | 79 | 74 | 73 | 61 |
| | P100 | | 66 | 65 | 62 | 58 | 58 | 50 |
| | P80 | | −14 | −11 | −7 | −5 | 0 | 3 |

| No. | | | 69 | 70 | 71 | 72 |
|---|---|---|---|---|---|---|
| Composition | | | L | L | M | M |
| Thickness T | | μm | 700 | 700 | 700 | 700 |
| First ion exchange step | NaNO₃/KNO₃ | mass % | 75/25 | 75/25 | 75/25 | 75/25 |
| | Treatment temperature | ° C. | 420 | 420 | 420 | 420 |
| | Treatment time | h | 3 | 3 | 3 | 3 |

TABLE 9-continued

| | | | | | | |
|---|---|---|---|---|---|---|
| Second ion exchange step | LiNO$_3$/KNO$_3$ | mass % | 1/99 | 1.5/98.5 | 1/99 | 1.5/98.5 |
| | Treatment temperature | °C. | 380 | 380 | 380 | 380 |
| | Treatment time | min. | 90 | 90 | 60 | 60 |
| CSmax | | MPa | 616 | 546 | 579 | 527 |
| CTmax | | MPa | 69 | 65 | 69 | 60 |
| CTmax · thickness T | | MPa · mm | 48 | 45 | 48 | 42 |
| DOLzero | | μm | 157 | 164 | 158 | 161 |
| DOLzero/thickness T | | % | 22 | 23 | 23 | 23 |
| CSb | | MPa | 43 | 23 | 19 | 21 |
| DOLb | | μm | 18 | 17 | 14 | 13 |
| DOLb/thickness T | | % | 2 | 2 | 2 | 2 |
| CSp | | MPa | 51 | 44 | 64 | 60 |
| DOLp | | μm | 53 | 67 | 57 | 66 |
| DOLp/thickness T | | % | 7 | 10 | 8 | 9 |
| CSp − CSb | | MPa | 8 | 21 | 46 | 39 |
| DOLp − DOLb | | μm | 35 | 51 | 43 | 53 |
| (DOLp − DOLb)/thickness T | | % | 5 | 7 | 6 | 8 |
| (CSp − CSb)/(DOLp − DOLb) | | MPa/μm | 0.2 | 0.4 | 1.1 | 0.7 |
| Simulated casing drop strength | | P180 | Unmeasured | Unmeasured | Unmeasured | Unmeasured |
| | | P120 | Unmeasured | Unmeasured | Unmeasured | Unmeasured |
| | | P100 | Unmeasured | Unmeasured | Unmeasured | Unmeasured |
| | | P80 | Unmeasured | Unmeasured | Unmeasured | Unmeasured |
| Calculated strength | | P180 | 98 | 92 | 108 | 106 |
| | | P120 | 76 | 75 | 82 | 85 |
| | | P100 | 61 | 62 | 65 | 68 |
| | | P80 | 0 | 5 | 0 | 1 |

TABLE 10

| No. | | | 73 | 74 | 75 | 76 | 77 | 78 | 79 | 80 | 81 | 82 |
|---|---|---|---|---|---|---|---|---|---|---|---|---|
| Composition | | | M | M | M | N | N | N | N | N | N | O |
| Thickness T | | μm | 700 | 700 | 700 | 700 | 700 | 700 | 698 | 698 | 698 | 700 |
| First ion exchange step | NaNO$_3$/KNO$_3$ | mass % | 75/25 | 75/25 | 75/25 | 75/25 | 75/25 | 75/25 | 75/25 | 75/25 | 75/25 | 75/25 |
| | Treatment temperature | °C. | 420 | 420 | 420 | 420 | 420 | 420 | 420 | 420 | 420 | 420 |
| | Treatment time | h | 3 | 3 | 3 | 3 | 3 | 3 | 3 | 3 | 3 | 3 |
| Second ion exchange step | LiNO$_3$/KNO$_3$ | mass % | 1/99 | 1.5/98.5 | 2/98 | 1/99 | 1.5/98.5 | 2/98 | 1/99 | 1.5/98.5 | 2/98 | 1/99 |
| | Treatment temperature | °C. | 380 | 380 | 380 | 380 | 380 | 380 | 380 | 380 | 380 | 380 |
| | Treatment time | min. | 90 | 90 | 90 | 60 | 60 | 60 | 90 | s | 90 | 60 |
| CSmax | | MPa | 629 | 571 | 527 | 645 | 557 | 524 | 647 | 582 | 529 | 613 |
| CTmax | | MPa | 70 | 61 | 52 | 57 | 52 | 49 | 52 | 49 | 43 | 59 |
| CTmax · thickness T | | MPa · mm | 49 | 42 | 36 | 40 | 36 | 34 | 36 | 34 | 30 | 41 |
| DOLzero | | μm | 158 | 165 | 168 | 152 | 161 | 164 | 145 | 157 | 165 | 151 |
| DOLzero/thickness T | | % | 23 | 24 | 24 | 22 | 23 | 23 | 21 | 22 | 24 | 22 |
| CSb | | MPa | 42 | 21 | 17 | 32 | 29 | 8 | 9 | 6 | 4 | 34 |
| DOLb | | μm | 18 | 17 | 17 | 16 | 17 | 15 | 17 | 19 | 21 | 17 |
| DOLb/thickness T | | % | 2 | 2 | 2 | 2 | 2 | 2 | 2 | 3 | 3 | 2 |
| CSp | | MPa | 48 | 43 | 37 | 47 | 39 | 38 | 48 | 27 | 25 | 49 |
| DOLp | | μm | 52 | 69 | 76 | 55 | 63 | 72 | 51 | 73 | 84 | 53 |
| DOLp/thickness T | | % | 7 | 10 | 11 | 8 | 9 | 10 | 7 | 11 | 12 | 8 |
| CSp − CSb | | MPa | 6 | 22 | 21 | 15 | 11 | 30 | 39 | 21 | 21 | 16 |
| DOLp − DOLb | | μm | 34 | 53 | 59 | 39 | 46 | 57 | 34 | 54 | 63 | 36 |
| (DOLp − DOLb)/thickness T | | % | 5 | 8 | 8 | 6 | 7 | 8 | 5 | 8 | 9 | 5 |
| (CSp − CSb)/(DOLp − DOLb) | | MPa/μm | 0.2 | 0.4 | 0.4 | 0.4 | 0.2 | 0.5 | 1.1 | 0.4 | 0.3 | 0.4 |
| Simulated casing drop strength | | P180 | Unmeasured | Unmeasured | Unmeasured | Unmeasured | Unmeasured | Unmeasured | Unmeasured | Unmeasured | Unmeasured | Unmeasured |
| | | P120 | Unmeasured | Unmeasured | Unmeasured | Unmeasured | Unmeasured | Unmeasured | Unmeasured | Unmeasured | Unmeasured | Unmeasured |
| | | P100 | Unmeasured | Unmeasured | Unmeasured | Unmeasured | Unmeasured | Unmeasured | Unmeasured | Unmeasured | Unmeasured | Unmeasured |
| | | P80 | Unmeasured | Unmeasured | Unmeasured | Unmeasured | Unmeasured | Unmeasured | Unmeasured | Unmeasured | Unmeasured | Unmeasured |
| Calculated strength | | P180 | 96 | 91 | 86 | 94 | 88 | 86 | 91 | 76 | 72 | — |
| | | P120 | 74 | 75 | 72 | 71 | 71 | 71 | 66 | 62 | 62 | — |
| | | P100 | 61 | 62 | 61 | 57 | 59 | 59 | 53 | 52 | 53 | — |
| | | P80 | 0 | 5 | 8 | 2 | 5 | 8 | 3 | 8 | 10 | — |

TABLE 11

| No. | | 83 | 84 | 85 | 86 | 87 | 88 | 89 | 90 | 91 | 92 |
|---|---|---|---|---|---|---|---|---|---|---|---|
| Composition | | O | O | O | O | O | P | P | P | P | P |
| Thickness T | μm | 700 | 700 | 698 | 698 | 698 | 700 | 700 | 700 | 700 | 700 |
| First ion exchange step | NaNO₃/KNO₃ mass % | 75/25 | 75/25 | 75/25 | 75/25 | 75/25 | 75/25 | 75/25 | 75/25 | 75/25 | 75/25 |
| | Treatment temperature ° C. | 420 | 420 | 420 | 420 | 420 | 420 | 420 | 420 | 420 | 420 |
| | Treatment time h | 3 | 3 | 3 | 3 | 3 | 1.5 | 1.5 | 3 | 1.5 | 3 |
| Second ion exchange step | LiNO₃/KNO₃ mass % | 1.5/98.5 | 2/98 | 1/99 | 1.5/98.5 | 2/98 | 2/98 | 1/99 | 1/99 | 1.5/98.5 | 1.5/98.5 |
| | Treatment temperature ° C. | 380 | 380 | 380 | 380 | 380 | 380 | 380 | 380 | 380 | 380 |
| | Treatment time min. | 60 | 60 | 90 | 90 | 90 | 60 | 60 | 60 | 60 | 60 |
| CSmax | MPa | 548 | 516 | 644 | 586 | 544 | 632 | 737 | 695 | 662 | 627 |
| CTmax | MPa | 51 | 50 | 55 | 47 | 45 | 66 | 56 | 80 | 77 | 82 |
| CTmax · thickness T | MPa · mm | 35 | 35 | 38 | 33 | 31 | 46 | 39 | 56 | 54 | 57 |
| DOLzero | μm | 161 | 170 | 147 | 153 | 172 | 153 | 144 | 154 | 153 | 158 |
| DOLzero/thickness T | % | 23 | 24 | 21 | 22 | 25 | 22 | 21 | 22 | 22 | 22 |
| CSb | MPa | 8 | −7 | 31 | 3 | 0 | 55 | 53 | 80 | 77 | 64 |
| DOLb | μm | 16 | 16 | 22 | 20 | 21 | 11 | 9 | 10 | 15 | 12 |
| DOLb/thickness T | % | 2 | 2 | 3 | 3 | 3 | 2 | 1 | 1 | 2 | 2 |
| CSp | MPa | 43 | 38 | 35 | 28 | 21 | 70 | 70 | 85 | 78 | 78 |
| DOLp | μm | 72 | 79 | 51 | 71 | 93 | 49 | 41 | 36 | 25 | 48 |
| DOLp/thickness T | % | 10 | 11 | 7 | 10 | 13 | 7 | 6 | 5 | 4 | 7 |
| CSp − CSb | MPa | 36 | 45 | 4 | 25 | 21 | 15 | 16 | 5 | 0 | 14 |
| DOLp − DOLb | μm | 56 | 63 | 29 | 51 | 72 | 38 | 32 | 26 | 10 | 36 |
| (DOLp − DOLb)/thickness T | % | 8 | 9 | 4 | 7 | 10 | 5 | 5 | 4 | 1 | 5 |
| (CSp − CSb)/(DOLp − DOLb) | MPa/μm | 0.6 | 0.7 | 0.1 | 0.5 | 0.3 | 0.4 | 0.5 | 0.2 | 0.0 | 0.4 |
| Simulated casing drop strength | P180 | Unmeasured | Unmeasured | Unmeasured | Unmeasured | Unmeasured | Unmeasured | Unmeasured | Unmeasured | Unmeasured | Unmeasured |
| | P120 | Unmeasured | Unmeasured | Unmeasured | Unmeasured | Unmeasured | Unmeasured | Unmeasured | Unmeasured | Unmeasured | Unmeasured |
| | P100 | Unmeasured | Unmeasured | Unmeasured | Unmeasured | Unmeasured | Unmeasured | Unmeasured | Unmeasured | Unmeasured | Unmeasured |
| | P80 | Unmeasured | Unmeasured | Unmeasured | Unmeasured | Unmeasured | Unmeasured | Unmeasured | Unmeasured | Unmeasured | Unmeasured |
| Calculated strength | P180 | — | — | — | — | — | 114 | 109 | 125 | 117 | 122 |
| | P120 | — | — | — | — | — | 84 | 76 | 91 | 85 | 91 |
| | P100 | — | — | — | — | — | 66 | 59 | 71 | 67 | 71 |
| | P80 | — | — | — | — | — | −5 | −4 | −10 | −8 | −7 |

TABLE 12

| No. | | 93 | 94 | 95 | 96 | 97 | 98 | 99 | 100 | 101 | 102 |
|---|---|---|---|---|---|---|---|---|---|---|---|
| Composition | | P | P | P | P | Q | Q | Q | Q | Q | R |
| Thickness T | μm | 700 | 700 | 700 | 700 | 700 | 700 | 700 | 700 | 700 | 700 |
| First ion exchange step | NaNO₃/KNO₃ mass % | 75/25 | 75/25 | 75/25 | 75/25 | 75/25 | 75/25 | 75/25 | 75/25 | 75/25 | 100/0 |
| | Treatment temperature ° C. | 420 | 420 | 420 | 420 | 420 | 420 | 420 | 420 | 420 | 380 |
| | Treatment time h | 1.5 | 3 | 1.5 | 3 | 1.5 | 3 | 1.5 | 3 | 3 | 4 |
| Second ion exchange step | LiNO₃/KNO₃ mass % | 2/98 | 2/98 | 1.5/98.5 | 1.5/98.5 | 2/98 | 1.5/98.5 | 2/98 | 2/98 | 1.5/98.5 | 2/98 |
| | Treatment temperature ° C. | 380 | 380 | 380 | 380 | 380 | 380 | 380 | 380 | 380 | 380 |
| | Treatment time min. | 90 | 90 | 90 | 90 | 60 | 60 | 90 | 90 | 90 | 30 |
| CSmax | MPa | 612 | 626 | 710 | 647 | 543 | 539 | 557 | 521 | 564 | 595 |
| CTmax | MPa | 61 | 61 | 70 | 67 | 61 | 74 | 53 | 62 | 70 | 41 |
| CTmax · thickness T | MPa · mm | 43 | 43 | 49 | 47 | 43 | 52 | 37 | 44 | 49 | 28 |
| DOLzero | μm | 165 | 174 | 158 | 167 | 147 | 154 | 159 | 164 | 162 | 168 |
| DOLzero/thickness T | % | 24 | 25 | 23 | 24 | 21 | 22 | 23 | 23 | 23 | 24 |
| CSb | MPa | 28 | 21 | 53 | 35 | 60 | 64 | 28 | 35 | 50 | −6 |
| DOLb | μm | 16 | 10 | 14 | 13 | 14 | 12 | 16 | 18 | 14 | 9 |
| DOLb/thickness T | % | 2 | 1 | 2 | 2 | 2 | 2 | 2 | 3 | 2 | 1 |
| CSp | MPa | 43 | 46 | 60 | 53 | 70 | 79 | 45 | 49 | 61 | 41 |
| DOLp | μm | 67 | 72 | 49 | 66 | 42 | 46 | 65 | 64 | 54 | 78 |
| DOLp/thickness T | % | 10 | 10 | 7 | 9 | 6 | 7 | 9 | 9 | 8 | 11 |
| CSp − CSb | MPa | 15 | 25 | 7 | 18 | 9 | 15 | 17 | 14 | 11 | 47 |
| DOLp − DOLb | μm | 51 | 62 | 35 | 52 | 28 | 34 | 49 | 46 | 39 | 69 |
| (DOLp − DOLb)/thickness T | % | 7 | 9 | 5 | 7 | 4 | 5 | 7 | 7 | 6 | 10 |
| (CSp − CSb)/(DOLp − DOLb) | MPa/μm | 0.3 | 0.4 | 0.2 | 0.3 | 0.3 | 0.5 | 0.4 | 0.3 | 0.3 | 0.7 |
| Simulated casing drop strength | P180 | Unmeasured | Unmeasured | Unmeasured | Unmeasured | Unmeasured | Unmeasured | Unmeasured | Unmeasured | Unmeasured | 108 |
| | P120 | Unmeasured | Unmeasured | Unmeasured | Unmeasured | Unmeasured | Unmeasured | Unmeasured | Unmeasured | Unmeasured | Unmeasured |

TABLE 12-continued

| No. | | 93 | 94 | 95 | 96 | 97 | 98 | 99 | 100 | 101 | 102 |
|---|---|---|---|---|---|---|---|---|---|---|---|
| | P100 | Unmeasured | Unmeasured | Unmeasured | Unmeasured | Unmeasured | Unmeasured | Unmeasured | Unmeasured | Unmeasured | 44 |
| | P80 | Unmeasured | Unmeasured | Unmeasured | Unmeasured | Unmeasured | Unmeasured | Unmeasured | Unmeasured | Unmeasured | 47 |
| Calculated strength | P180 | 92 | 94 | 107 | 102 | 111 | 121 | 94 | 98 | 108 | 87 |
| | P120 | 75 | 79 | 82 | 83 | 78 | 88 | 75 | 79 | 84 | 74 |
| | P100 | 63 | 67 | 66 | 69 | 61 | 69 | 61 | 65 | 68 | 62 |
| | P80 | 4 | 9 | −3 | 1 | −5 | −6 | 3 | 2 | −1 | 10 |

TABLE 13

| | No. | | 103 | 104 | 105 | 106 | 107 | 108 | 109 | 110 | 111 | 112 |
|---|---|---|---|---|---|---|---|---|---|---|---|---|
| | Composition | | R | R | R | R | R | R | R | R | R | R |
| | Thickness T | μm | 700 | 700 | 700 | 700 | 700 | 700 | 700 | 700 | 700 | 700 |
| First ion exchange step | $NaNO_3/KNO_3$ | mass % | 100/0 | 100/0 | 100/0 | 100/0 | 100/0 | 80/20 | 80/20 | 80/20 | 80/20 | 80/20 |
| | Treatment temperature | °C. | 380 | 380 | 380 | 380 | 380 | 380 | 380 | 380 | 380 | 380 |
| | Treatment time | h | 4 | 4 | 9 | 9 | 9 | 9 | 4 | 9 | 4 | 9 |
| Second ion exchange step | $LiNO_3/KNO_3$ | mass % | 2/98 | 2/98 | 2/98 | 2/98 | 2/98 | 2/98 | 2/98 | 2/98 | 2/98 | 2/98 |
| | Treatment temperature | °C. | 380 | 380 | 380 | 380 | 380 | 380 | 380 | 380 | 380 | 380 |
| | Treatment time | min. | 45 | 60 | 30 | 45 | 60 | 30 | 30 | 45 | 45 | 60 |
| | CSmax | MPa | 637 | 671 | 528 | 559 | 590 | 583 | 627 | 636 | 636 | 626 |
| | CTmax | MPa | 37 | 30 | 35 | 28 | 26 | 39 | 43 | 44 | 44 | 32 |
| | CTmax · thickness T | MPa · mm | 26 | 21 | 25 | 20 | 18 | 27 | 30 | 31 | 31 | 23 |
| | DOLzero | μm | 172 | 181 | 183 | 188 | 197 | 163 | 158 | 158 | 158 | 176 |
| | DOLzero/thickness T | % | 24 | 26 | 26 | 27 | 28 | 23 | 23 | 23 | 23 | 25 |
| | CSb | MPa | −2 | −9 | −56 | −46 | −29 | −2 | 11 | 12 | 12 | −12 |
| | DOLb | μm | 22 | 35 | 9 | 12 | 26 | 21 | 11 | 43 | 43 | 30 |
| | DOLb/thickness T | % | 3 | 5 | 1 | 2 | 4 | 3 | 2 | 6 | 6 | 4 |
| | CSp | MPa | 31 | 18 | 40 | 31 | 24 | 45 | 43 | 32 | 32 | 22 |
| | DOLp | μm | 90 | 106 | 87 | 103 | 113 | 76 | 70 | 90 | 90 | 102 |
| | DOLp/thickness T | % | 13 | 15 | 12 | 15 | 16 | 11 | 10 | 13 | 13 | 15 |
| | CSp − CSb | MPa | 33 | 27 | 96 | 77 | 52 | 48 | 32 | 20 | 20 | 35 |
| | DOLp − DOLb | μm | 68 | 71 | 79 | 91 | 88 | 54 | 59 | 47 | 47 | 72 |
| | (DOLp − DOLb)/thickness T | % | 10 | 10 | 11 | 13 | 13 | 8 | 8 | 7 | 7 | 10 |
| | (CSp − CSb)/(DOLp − DOLb) | MPa/μm | 0.5 | 0.4 | 1.2 | 0.8 | 0.6 | 0.9 | 0.5 | 0.4 | 0.4 | 0.5 |
| Simulated casing drop strength | P180 | | Unmeasured | Unmeasured | Unmeasured | Unmeasured | Unmeasured | Unmeasured | Unmeasured | Unmeasured | Unmeasured | Unmeasured |
| | P120 | | Unmeasured | Unmeasured | Unmeasured | Unmeasured | Unmeasured | Unmeasured | Unmeasured | Unmeasured | Unmeasured | Unmeasured |
| | P100 | | Unmeasured | Unmeasured | Unmeasured | Unmeasured | Unmeasured | Unmeasured | Unmeasured | Unmeasured | Unmeasured | Unmeasured |
| | P80 | | Unmeasured | Unmeasured | Unmeasured | Unmeasured | Unmeasured | Unmeasured | Unmeasured | Unmeasured | Unmeasured | Unmeasured |
| Calculated strength | P180 | | 74 | 58 | 78 | 65 | 50 | 86 | 91 | 75 | 75 | 58 |
| | P120 | | 67 | 55 | 74 | 67 | 57 | 74 | 74 | 66 | 66 | 58 |
| | P100 | | 58 | 50 | 64 | 60 | 53 | 61 | 60 | 56 | 56 | 52 |
| | P80 | | 13 | 19 | 18 | 20 | 24 | 11 | 5 | 6 | 6 | 18 |

TABLE 14

| | No. | | 113 | 114 | 115 | 116 | 117 | 118 | 119 | 120 | 121 | 122 |
|---|---|---|---|---|---|---|---|---|---|---|---|---|
| | Composition | | R | R | R | R | R | R | R | R | R | R |
| | Thickness T | μm | 700 | 700 | 700 | 700 | 700 | 700 | 700 | 700 | 700 | 700 |
| First ion exchange step | $NaNO_3/KNO_3$ | mass % | 80/20 | 60/40 | 60/40 | 60/40 | 60/40 | 60/40 | 60/40 | 40/60 | 40/60 | 40/60 |
| | Treatment temperature | °C. | 380 | 380 | 380 | 380 | 380 | 380 | 380 | 380 | 380 | 380 |
| | Treatment time | h | 4 | 4 | 9 | 9 | 4 | 9 | 4 | 4 | 9 | 4 |
| Second ion exchange step | $LiNO_3/KNO_3$ | mass % | 2/98 | 2/98 | 2/98 | 2/98 | 2/98 | 2/98 | 2/98 | 2/98 | 2/98 | 2/98 |
| | Treatment temperature | °C. | 380 | 380 | 380 | 380 | 380 | 380 | 380 | 380 | 380 | 380 |
| | Treatment time | min. | 60 | 30 | 30 | 45 | 45 | 60 | 60 | 45 | 45 | 60 |
| | CSmax | MPa | 677 | 631 | 597 | 692 | 692 | 668 | 717 | 657 | 655 | 673 |
| | CTmax | MPa | 32 | 48 | 48 | 44 | 44 | 35 | 39 | 45 | 45 | 37 |
| | CTmax · thickness T | MPa · mm | 22 | 33 | 34 | 31 | 31 | 24 | 27 | 31 | 31 | 26 |
| | DOLzero | μm | 171 | 150 | 147 | 149 | 149 | 161 | 149 | 153 | 144 | 151 |

TABLE 14-continued

| No. | | 113 | 114 | 115 | 116 | 117 | 118 | 119 | 120 | 121 | 122 |
|---|---|---|---|---|---|---|---|---|---|---|---|
| DOLzero/thickness T | % | 24 | 21 | 21 | 21 | 21 | 23 | 21 | 22 | 21 | 22 |
| CSb | MPa | 1 | 32 | 31 | 34 | 34 | −14 | 9 | 17 | 8 | 6 |
| DOLb | μm | 31 | 16 | 41 | 20 | 20 | 40 | 46 | 45 | 38 | 48 |
| DOLb/thickness T | % | 4 | 2 | 6 | 3 | 3 | 6 | 7 | 6 | 5 | 7 |
| CSp | MPa | 20 | 42 | 42 | 34 | 34 | 24 | 18 | 31 | 27 | 24 |
| DOLp | μm | 108 | 57 | 73 | 32 | 32 | 94 | 90 | 85 | 75 | 95 |
| DOLp/thickness T | % | 15 | 8 | 10 | 5 | 5 | 13 | 13 | 12 | 11 | 14 |
| CSp − CSb | MPa | 19 | 10 | 10 | 0 | 0 | 38 | 9 | 14 | 18 | 18 |
| DOLp − DOLb | μm | 77 | 41 | 32 | 13 | 13 | 54 | 43 | 41 | 37 | 47 |
| (DOLp − DOLb)/thickness T | % | 11 | 6 | 5 | 2 | 2 | 8 | 6 | 6 | 5 | 7 |
| (CSp − CSb)/(DOLp − DOLb) | MPa/μm | 0.2 | 0.3 | 0.3 | 0.0 | 0.0 | 0.7 | 0.2 | 0.3 | 0.5 | 0.4 |
| Simulated casing drop strength | P180 | Unmeasured | Unmeasured | Unmeasured | Unmeasured | Unmeasured | Unmeasured | Unmeasured | Unmeasured | Unmeasured | Unmeasured |
| | P120 | Unmeasured | Unmeasured | Unmeasured | Unmeasured | Unmeasured | Unmeasured | Unmeasured | Unmeasured | Unmeasured | Unmeasured |
| | P100 | Unmeasured | Unmeasured | Unmeasured | Unmeasured | Unmeasured | Unmeasured | Unmeasured | Unmeasured | Unmeasured | Unmeasured |
| | P80 | Unmeasured | Unmeasured | Unmeasured | Unmeasured | Unmeasured | Unmeasured | Unmeasured | Unmeasured | Unmeasured | Unmeasured |
| Calculated strength | P180 | 61 | 91 | 89 | 81 | 81 | 59 | 66 | 76 | 73 | 66 |
| | P120 | 57 | 70 | 70 | 61 | 61 | 58 | 55 | 64 | 59 | 59 |
| | P100 | 51 | 56 | 55 | 51 | 51 | 50 | 47 | 53 | 48 | 50 |
| | P80 | 14 | 1 | 1 | 4 | 4 | 13 | 8 | 5 | 5 | 7 |

TABLE 15

| No. | | | 123 | 124 | 125 | 126 | 127 | 128 |
|---|---|---|---|---|---|---|---|---|
| | Composition | | R | R | R | R | R | R |
| | Thickness T | μm | 700 | 700 | 700 | 700 | 700 | 700 |
| First ion exchange step | NaNO₃/KNO₃ | mass % | 40/60 | 100/0 | 100/0 | 100/0 | 80/20 | 80/20 |
| | Treatment temperature | °C. | 380 | 380 | 380 | 380 | 380 | 380 |
| | Treatment time | h | 9 | 3 | 4 | 9 | 4 | 9 |
| Second ion exchange step | LiNO₃/KNO₃ | mass % | 2/98 | 1.5/98.5 | 1.5/98.5 | 1.5/98.5 | 1.5/98.5 | 1.5/98.5 |
| | Treatment temperature | °C. | 380 | 380 | 380 | 380 | 380 | 380 |
| | Treatment time | min. | 60 | 30 | 30 | 30 | 30 | 30 |
| | CSmax | MPa | 646 | 685 | 670 | 610 | 655 | 675 |
| | CTmax | MPa | 34 | 52 | 50 | 41 | 56 | 48 |
| | CTmax · thickness T | MPa · mm | 24 | 36 | 35 | 28 | 40 | 34 |
| | DOLzero | μm | 146 | 150 | 149 | 154 | 145 | 148 |
| | DOLzero/thickness T | % | 21 | 21 | 21 | 22 | 21 | 21 |
| | CSb | MPa | −6 | 21 | 23 | −7 | 28 | 24 |
| | DOLb | μm | 45 | 24 | 29 | 21 | 26 | 26 |
| | DOLb/thickness T | % | 6 | 3 | 4 | 3 | 4 | 4 |
| | CSp | MPa | 22 | 54 | 51 | 50 | 56 | 47 |
| | DOLp | μm | 95 | 62 | 68 | 75 | 59 | 66 |
| | DOLp/thickness T | % | 14 | 9 | 10 | 11 | 8 | 9 |
| | CSp − CSb | MPa | 28 | 34 | 28 | 57 | 28 | 23 |
| | DOLp − DOLb | μm | 49 | 38 | 39 | 54 | 34 | 41 |
| | (DOLp − DOLb)/thickness T | % | 7 | 5 | 6 | 8 | 5 | 6 |
| | (CSp − CSb)/(DOLp − DOLb) | MPa/μm | 0.6 | 0.9 | 0.7 | 1.0 | 0.8 | 0.6 |
| Simulated casing drop strength | | P180 | Unmeasured | Unmeasured | Unmeasured | Unmeasured | Unmeasured | Unmeasured |
| | | P120 | Unmeasured | Unmeasured | Unmeasured | Unmeasured | Unmeasured | Unmeasured |
| | | P100 | Unmeasured | Unmeasured | Unmeasured | Unmeasured | Unmeasured | Unmeasured |
| | | P80 | Unmeasured | Unmeasured | Unmeasured | Unmeasured | Unmeasured | Unmeasured |
| Calculated strength | | P180 | 60 | 99 | 96 | 92 | 100 | 93 |
| | | P120 | 55 | 75 | 75 | 77 | 74 | 72 |
| | | P100 | 47 | 59 | 59 | 62 | 57 | 57 |
| | | P80 | 6 | 1 | 0 | 3 | −3 | 0 |

| No. | | | 129 | 130 | 131 | 132 |
|---|---|---|---|---|---|---|
| | Composition | | R | R | R | R |
| | Thickness T | μm | 700 | 700 | 700 | 700 |
| First ion exchange step | NaNO₃/KNO₃ | mass % | 60/40 | 100/0 | 100/0 | 100/0 |
| | Treatment temperature | °C. | 380 | 380 | 380 | 380 |
| | Treatment time | h | 9 | 3 | 4 | 9 |

TABLE 15-continued

| | | | | | | |
|---|---|---|---|---|---|---|
| Second ion exchange step | LiNO₃/KNO₃ | mass % | 1.5/98.5 | 1.5/98.5 | 1.5/98.5 | 1.5/98.5 |
| | Treatment temperature | ° C. | 380 | 380 | 380 | 380 |
| | Treatment time | min. | 30 | 45 | 45 | 45 |
| CSmax | | MPa | 657 | 722 | 751 | 659 |
| CTmax | | MPa | 49 | 43 | 46 | 37 |
| CTmax · thickness T | | MPa · mm | 34 | 30 | 32 | 26 |
| DOLzero | | μm | 139 | 154 | 160 | 169 |
| DOLzero/thickness T | | % | 20 | 22 | 23 | 24 |
| CSb | | MPa | 30 | 11 | 7 | −13 |
| DOLb | | μm | 32 | 18 | 16 | 16 |
| DOLb/thickness T | | % | 5 | 3 | 2 | 2 |
| CSp | | MPa | 43 | 33 | 34 | 32 |
| DOLp | | μm | 67 | 73 | 78 | 91 |
| DOLp/thickness T | | % | 10 | 10 | 11 | 13 |
| CSp − CSb | | MPa | 14 | 22 | 27 | 45 |
| DOLp − DOLb | | μm | 35 | 55 | 63 | 75 |
| (DOLp − DOLb)/thickness T | | % | 5 | 8 | 9 | 11 |
| (CSp − CSb)/(DOLp − DOLb) | | MPa/μm | 0.4 | 0.4 | 0.4 | 0.6 |
| Simulated casing drop strength | P180 | | Unmeasured | 86 | Unmeasured | Unmeasured |
| | P120 | | Unmeasured | Unmeasured | Unmeasured | Unmeasured |
| | P100 | | Unmeasured | 49 | Unmeasured | Unmeasured |
| | P80 | | Unmeasured | 50 | Unmeasured | Unmeasured |
| Calculated strength | P180 | | 91 | 81 | 80 | 73 |
| | P120 | | 69 | 66 | 68 | 68 |
| | P100 | | 53 | 54 | 57 | 58 |
| | P80 | | −7 | 4 | 7 | 11 |

TABLE 16

| | | | 133 | 134 | 135 | 136 | 137 | 138 | 139 | 140 | 141 | 142 |
|---|---|---|---|---|---|---|---|---|---|---|---|---|
| No. | | | | | | | | | | | | |
| Composition | | | R | R | R | R | R | R | R | R | R | R |
| Thickness T | | μm | 700 | 700 | 700 | 700 | 700 | 700 | 700 | 700 | 700 | 700 |
| First ion exchange step | NaNO₃/KNO₃ | mass % | 80/20 | 80/20 | 100/0 | 100/0 | 100/0 | 100/0 | 80/20 | 80/20 | 80/20 | 80/20 |
| | Treatment temperature | ° C. | 380 | 380 | 380 | 380 | 380 | 380 | 380 | 380 | 380 | 380 |
| | Treatment time | h | 4 | 9 | 9 | 4 | 9 | 4 | 9 | 4 | 9 | 4 |
| Second ion exchange step | LiNO₃/KNO₃ | mass % | 1.5/98.5 | 1.5/98.5 | 1/99 | 1/99 | 1/99 | 1/99 | 1/99 | 1/99 | 1/99 | 1/99 |
| | Treatment temperature | ° C. | 380 | 380 | 380 | 380 | 380 | 380 | 380 | 380 | 380 | 380 |
| | Treatment time | min. | 45 | 45 | 30 | 30 | 45 | 45 | 30 | 30 | 45 | 45 |
| CSmax | | MPa | 709 | 676 | 715 | 758 | 768 | 717 | 721 | 796 | 739 | 761 |
| CTmax | | MPa | 46 | 43 | 46 | 52 | 42 | 45 | 52 | 52 | 50 | 41 |
| CTmax · thickness T | | MPa · mm | 33 | 30 | 32 | 36 | 30 | 32 | 37 | 37 | 35 | 28 |
| DOLzero | | μm | 154 | 157 | 155 | 150 | 162 | 154 | 149 | 147 | 152 | 148 |
| DOLzero/thickness T | | % | 22 | 22 | 22 | 21 | 23 | 22 | 21 | 21 | 22 | 21 |
| CSb | | MPa | 19 | −11 | 11 | 36 | −2 | 31 | 34 | 46 | 24 | 36 |
| DOLb | | μm | 31 | 26 | 24 | 27 | 11 | 47 | 35 | 12 | 35 | 49 |
| DOLb/thickness T | | % | 4 | 4 | 3 | 4 | 2 | 7 | 5 | 2 | 5 | 7 |
| CSp | | MPa | 33 | 35 | 47 | 48 | 37 | 35 | 47 | 52 | 37 | 37 |
| DOLp | | μm | 76 | 80 | 72 | 64 | 74 | 85 | 68 | 40 | 76 | 67 |
| DOLp/thickness T | | % | 11 | 11 | 10 | 9 | 11 | 12 | 10 | 6 | 11 | 10 |
| CSp − CSb | | MPa | 14 | 45 | 36 | 12 | 39 | 5 | 13 | 6 | 12 | 1 |
| DOLp − DOLb | | μm | 45 | 54 | 49 | 37 | 64 | 38 | 33 | 29 | 41 | 18 |
| (DOLp − DOLb)/thickness T | | % | 6 | 8 | 7 | 5 | 9 | 5 | 5 | 4 | 6 | 3 |
| (CSp − CSb)/(DOLp − DOLb) | | MPa/μm | 0.3 | 0.8 | 0.7 | 0.3 | 0.6 | 0.1 | 0.4 | 0.2 | 0.3 | 0.0 |
| Simulated casing drop strength | P180 | | Unmeasured | Unmeasured | Unmeasured | Unmeasured | Unmeasured | Unmeasured | Unmeasured | Unmeasured | Unmeasured | Unmeasured |
| | P120 | | Unmeasured | Unmeasured | Unmeasured | Unmeasured | Unmeasured | Unmeasured | Unmeasured | 140 | Unmeasured | Unmeasured |
| | P100 | | Unmeasured | Unmeasured | Unmeasured | Unmeasured | Unmeasured | Unmeasured | Unmeasured | 56 | Unmeasured | Unmeasured |
| | P80 | | Unmeasured | Unmeasured | Unmeasured | Unmeasured | Unmeasured | Unmeasured | Unmeasured | 32 | Unmeasured | Unmeasured |
| Calculated strength | P180 | | 81 | 77 | 92 | 96 | 84 | 84 | 93 | 96 | 96 | 92 |
| | P120 | | 66 | 67 | 75 | 75 | 70 | 70 | 72 | 69 | 75 | 77 |
| | P100 | | 55 | 55 | 61 | 59 | 58 | 57 | 57 | 55 | 59 | 62 |
| | P80 | | 2 | 7 | 3 | −2 | 9 | −1 | 0 | 1 | 0 | 3 |

TABLE 17

| No. | | 143 | 144 | 145 | 146 | 147 | 148 | 149 | 150 | 151 | 152 |
|---|---|---|---|---|---|---|---|---|---|---|---|
| Composition | | R | R | R | S | S | S | S | T | T | T |
| Thickness T | μm | 700 | 700 | 700 | 700 | 700 | 780 | 780 | 700 | 700 | 700 |
| First ion exchange step NaNO$_3$/KNO$_3$ | mass % | 60/40 | 40/60 | 40/60 | 100/0 | 100/0 | 100/0 | 100/0 | 75/25 | 75/25 | 75/25 |
| Treatment temperature | ° C. | 380 | 380 | 380 | 380 | 380 | 380 | 380 | 410 | 410 | 410 |
| Treatment time | h | 9 | 4 | 9 | 3 | 3 | 3 | 3 | 3 | 3 | 3 |
| Second ion exchange step LiNO$_3$/KNO$_3$ | mass % | 1/99 | 1/99 | 1/99 | 2/98 | 2/98 | 2.5/97.5 | 2.5/97.5 | 0.5/99.5 | 1/99 | 1.5/98.5 |
| Treatment temperature | ° C. | 380 | 380 | 380 | 380 | 380 | 380 | 380 | 380 | 380 | 380 |
| Treatment time | min. | 30 | 45 | 45 | 45 | 60 | 45 | 60 | 45 | 45 | 45 |
| CSmax | MPa | 705 | 773 | 737 | 727 | 852 | 794 | 748 | 844 | 764 | 685 |
| CTmax | MPa | 57 | 46 | 37 | 46 | 46 | 46 | 43 | 65 | 56 | 53 |
| CTmax · thickness T | MPa · mm | 40 | 32 | 26 | 32 | 32 | 36 | 33 | 45 | 39 | 37 |
| DOLzero | μm | 141 | 144 | 140 | 168 | 177 | 179 | 183 | 146 | 159 | 161 |
| DOLzero/thickness T | % | 20 | 21 | 20 | 24 | 25 | 23 | 24 | 21 | 23 | 23 |
| CSb | MPa | 35 | 32 | 23 | 45 | 34 | 30 | 24 | 60 | 37 | 13 |
| DOLb | μm | 32 | 15 | 41 | 13 | 10 | 10 | 11 | 18 | 13 | 16 |
| DOLb/thickness T | % | 5 | 2 | 6 | 2 | 1 | 1 | 1 | 3 | 2 | 2 |
| CSp | MPa | 45 | 47 | 28 | 52 | 45 | 48 | 39 | 60 | 46 | 40 |
| DOLp | pm | 63 | 44 | 69 | 54 | 64 | 71 | 74 | 20 | 58 | 72 |
| DOLp/thickness T | % | 9 | 6 | 10 | 8 | 9 | 9 | 9 | 3 | 8 | 10 |
| CSp − CSb | MPa | 10 | 15 | 5 | 7 | 11 | 18 | 14 | 0 | 9.0 | 27 |
| DOLp − DOLb | μm | 31 | 30 | 28 | 41 | 54 | 61 | 63 | 2 | 45 | 57 |
| (DOLp − DOLb)/thickness T | % | 4 | 4 | 4 | 6 | 8 | 8 | 8 | 0 | 6 | 8 |
| (CSp − CSb)/(DOLp − DOLb) | MPa/μm | 0.3 | 0.5 | 0.2 | 0.2 | 0.2 | 0.3 | 0.2 | 0.0 | 0.2 | 0.5 |
| Simulated casing drop strength P180 | | Unmeasured | Unmeasured | Unmeasured | Unmeasured | Unmeasured | Unmeasured | Unmeasured | 178 | 167 | 182 |
| P120 | | Unmeasured | Unmeasured | Unmeasured | Unmeasured | Unmeasured | Unmeasured | Unmeasured | 135 | 165 | 132 |
| P100 | | Unmeasured | Unmeasured | Unmeasured | Unmeasured | Unmeasured | Unmeasured | Unmeasured | 33 | 41 | 38 |
| P80 | | Unmeasured | Unmeasured | Unmeasured | Unmeasured | Unmeasured | Unmeasured | Unmeasured | Unmeasured | Unmeasured | Unmeasured |
| Calculated strength P180 | | 95 | 80 | 73 | 100 | 94 | 97 | 88 | 100 | 95 | 88 |
| P120 | | 68 | 68 | 68 | 80 | 78 | 82 | 75 | 72 | 75 | 72 |
| P100 | | 53 | 57 | 58 | 66 | 66 | 70 | 65 | 56 | 61 | 60 |
| P80 | | −6 | 7 | 11 | 8 | 12 | 13 | 16 | −4 | 1 | 4 |

TABLE 18

| No. | | 153 | 154 | 155 | 156 | 157 | 158 | 159 | 160 |
|---|---|---|---|---|---|---|---|---|---|
| Composition | | T | T | T | T | T | T | T | T |
| Thickness T | μm | 700 | 700 | 700 | 550 | 550 | 550 | 550 | 800 |
| First ion exchange step NaNO$_3$/KNO$_3$ | mass % | 60/40 | 60/40 | 60/40 | 75/25 | 60/40 | 60/40 | 30/70 | 75/25 |
| Treatment temperature | ° C. | 380 | 380 | 380 | 410 | 380 | 380 | 380 | 410 |
| Treatment time | h | 3 | 3 | 3 | 3 | 2.5 | 3 | 1.5 | 3 |
| Second ion exchange step LiNO$_3$/KNO$_3$ | mass % | 0.5/99.5 | 1/99 | 1.5/98.5 | 1/99 | 1/99 | 1/99 | 1/99 | 1/99 |
| Treatment temperature | ° C. | 380 | 380 | 380 | 380 | 380 | 380 | 380 | 380 |
| Treatment time | min. | 45 | 45 | 45 | 45 | 45 | 45 | 45 | 45 |
| CSmax | MPa | 874 | 781 | 723 | 739 | 765 | 733 | 790 | 773 |
| CTmax | MPa | 65 | 65 | 61 | 48 | 63 | 52 | 53 | 67 |
| CTmax · thickness T | MPa · mm | 46 | 46 | 43 | 26 | 35 | 29 | 29 | 54 |
| DOLzero | μm | 144 | 150 | 151 | 126 | 117 | 120 | 115 | 173 |
| DOLzero/thickness T | % | 21 | 21 | 22 | 23 | 21 | 22 | 21 | 22 |
| CSb | MPa | 49 | 55 | 45 | 15 | 35 | 24 | 22 | 55 |
| DOLb | μm | 14 | 14 | 13 | 14 | 14 | 15 | 14 | 14 |
| DOLb/thickness T | % | 2 | 2 | 2 | 3 | 2 | 3 | 3 | 2 |
| CSp | MPa | 64 | 58 | 55 | 27 | 41 | 38 | 35 | 63 |
| DOLp | μm | 45 | 37 | 44 | 57 | 35 | 52 | 45 | 47 |
| DOLp/thickness T | % | 6 | 5 | 6 | 10 | 6 | 9 | 8 | 6 |
| CSp − CSb | MPa | 15 | 3 | 10 | 12 | 6 | 13 | 13 | 8 |
| DOLp − DOLb | μm | 32 | 23 | 32 | 43 | 21 | 37 | 31 | 33 |
| (DOLp − DOLb)/thickness T | % | 5 | 3 | 5 | 8 | 4 | 7 | 6 | 4 |
| (CSp − CSb)/(DOLp − DOLb) | MPa/μm | 0.5 | 0.1 | 0.3 | 0.3 | 0.3 | 0.4 | 0.4 | 0.3 |
| Simulated casing drop strength P180 | | 179 | 188 | 177 | Unmeasured | Unmeasured | Unmeasured | Unmeasured | Unmeasured |
| P120 | | 131 | 123 | 158 | Unmeasured | Unmeasured | Unmeasured | Unmeasured | Unmeasured |

TABLE 18-continued

| No. | | 153 | 154 | 155 | 156 | 157 | 158 | 159 | 160 |
|---|---|---|---|---|---|---|---|---|---|
| | P100 | 28 | 26 | 33 | Unmeasured | Unmeasured | Unmeasured | Unmeasured | Unmeasured |
| | P80 | Unmeasured | Unmeasured | Unmeasured | Unmeasured | Unmeasured | Unmeasured | Unmeasured | Unmeasured |
| Calculated strength | P180 | 106 | 101 | 99 | 75 | 80 | 83 | 78 | 78 |
| | P120 | 75 | 74 | 72 | 54 | 52 | 56 | 51 | 51 |
| | P100 | 58 | 59 | 58 | 41 | 39 | 40 | 37 | 37 |
| | P80 | −6 | −2 | 0 | −6 | −14 | −13 | −11 | −11 |

First, the stress profile of each of the samples was measured. The stress profile of each of Samples Nos. 1 to 10 and Nos. 13 to 160 was measured with a surface stress meter FSM-6000LE and SLP-1000 manufactured by Orihara Industrial Co., Ltd. Measurement results were synthesized using a data synthesis application pmc preloaded on the above-mentioned apparatus to yield a retardation profile. The coverage of each set of data in the synthesis was set as follows: from the surface to 10 μm for FSM-6000LE; and 30 μm or more from the surface for SLP-1000. A stress profile was determined from the yielded retardation profile through such analysis as described below. First, initial values were set as shown in the following table, and the following expression R(x) at each depth x in the yielded retardation profile was calculated. In this case, the following setting was adopted: Δ=0.01 [um]. The sum of squared differences between the R(x) and the yielded retardation profile was calculated, and various variables A1, A2, A3, B1, B2, B3, and C1 were set so that the sum of squared differences became minimum. More specifically, with use of "GRG Nonlinear" as a solving method in the Solver function of Excel, approximation was performed by applying ranges and restriction conditions to the various variables in accordance with the following table. The approximation calculation was repeated until a correlation coefficient between the R(x) and the retardation profile exceeded 0.9995. When the correlation coefficient did not reach 0.9995, measurement with SLP-1000 was performed a plurality of times, and the analysis was performed using averaged measurement data from the plurality of times of measurement. The following expression σ(x) expressed using the various variables obtained as described above was adopted as the stress profile. The stress profile of each of Sample No. 11 and Sample No. 12 was measured with the surface stress meter FSM-6000LE manufactured by Orihara Industrial Co., Ltd. An optical elastic constant C [nm/cm/MPa] was measured for each sample by using an optical heterodyne interference method, more specifically, by using PEL-3A-XR manufactured by Uniopt Co., Ltd. An apparatus constant k is a constant calculated in SLP-1000 by inputting the refractive index of each sample into the apparatus, more specifically, a value obtained by dividing a kDP value described in a measurement result file by a stress calibration coefficient. The refractive index was measured for each sample by using a V-block method, more specifically, by using KPR-2000 manufactured by Shimadzu Corporation.

$$\sigma(x) = A1 \cdot \text{erfc}(B1 \cdot x) + A2 \cdot \text{erfc}(B2 \cdot x) + A3 \cdot \text{erfc}(B3 \cdot x) + C1$$

$$R(x) = R_0 + k \cdot C \cdot \frac{360}{\lambda} \int_0^x \sigma(t) dt =$$

-continued $$\begin{cases} R_0 & (x = 0) \\ R_0 + k \cdot C \cdot \frac{360}{\lambda} \cdot \sum_{k=1}^{\frac{x}{\Delta}} \left[ \frac{\sigma(\Delta \cdot k) + \sigma(\Delta \cdot (k+1))}{2} \cdot \Delta \right] & (x > 0) \end{cases}$$

k: apparatus constant, C: optical elastic constant, λ: measurement wavelength (640 nm)

TABLE 19

| Variable | Range/condition | Initial value |
|---|---|---|
| A1 | 0 to 2,000 | 500 |
| A2 | −2,000 to 0 | −200 |
| A3 | 0 to 2,000 | 200 |
| B1 | 0.001 to 1 | 0.2 |
| B2 | 0.001 to 1 | 0.01 |
| B3 | 0.001 to 1 | 0.01 |
| C1 | −200 to 0 | −50 |
| R0 | Value at depth of 0 μm in retardation profile | |
| A1 + A2 + A3 + C | CS value measured with FSM-6000LE | |

Figure 5:
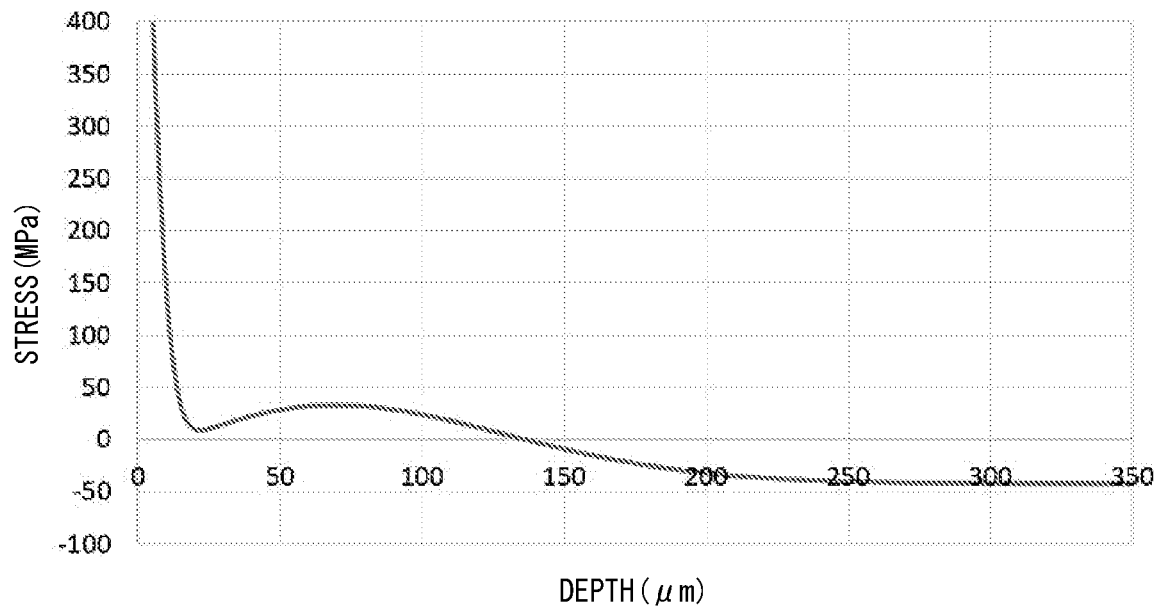
FIG. 5 is a graph for showing the stress profile of a tempered glass according to Sample No. 1.
Figure 6:
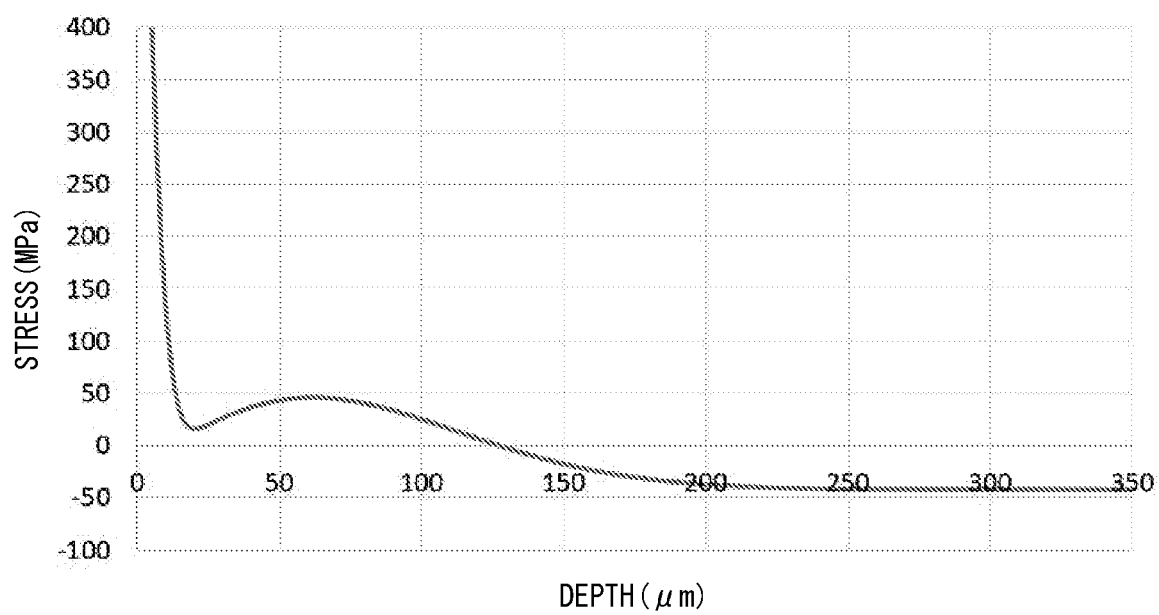
FIG. 6 is a graph for showing the stress profile of a tempered glass according to Sample No. 2.
Figure 7:
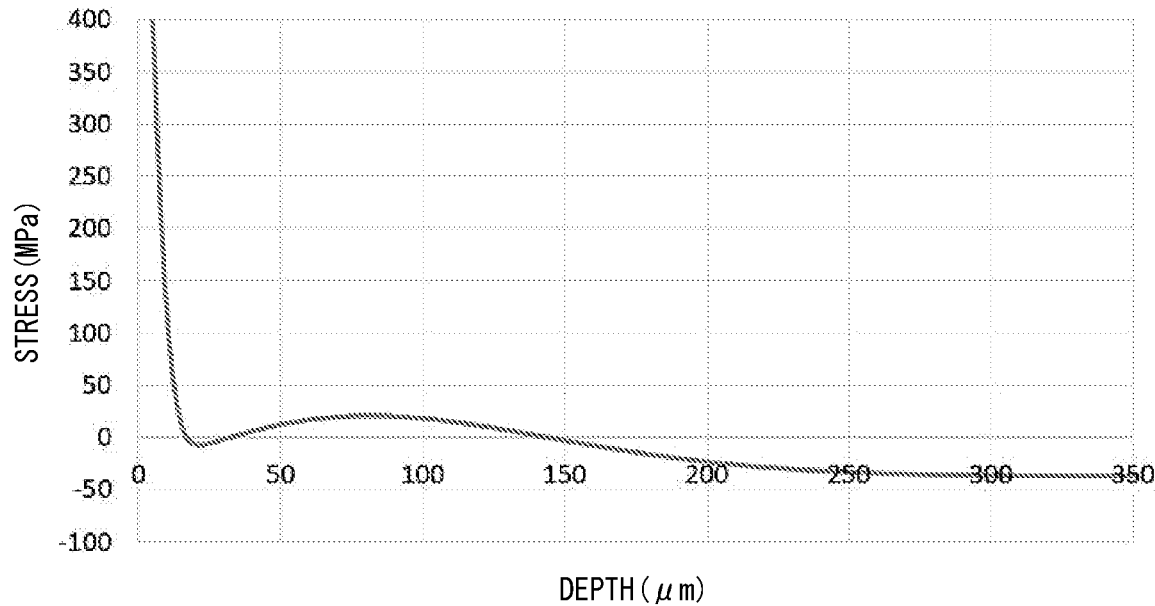
FIG. 7 is a graph for showing the stress profile of a tempered glass according to Sample No. 3.
Figure 8:
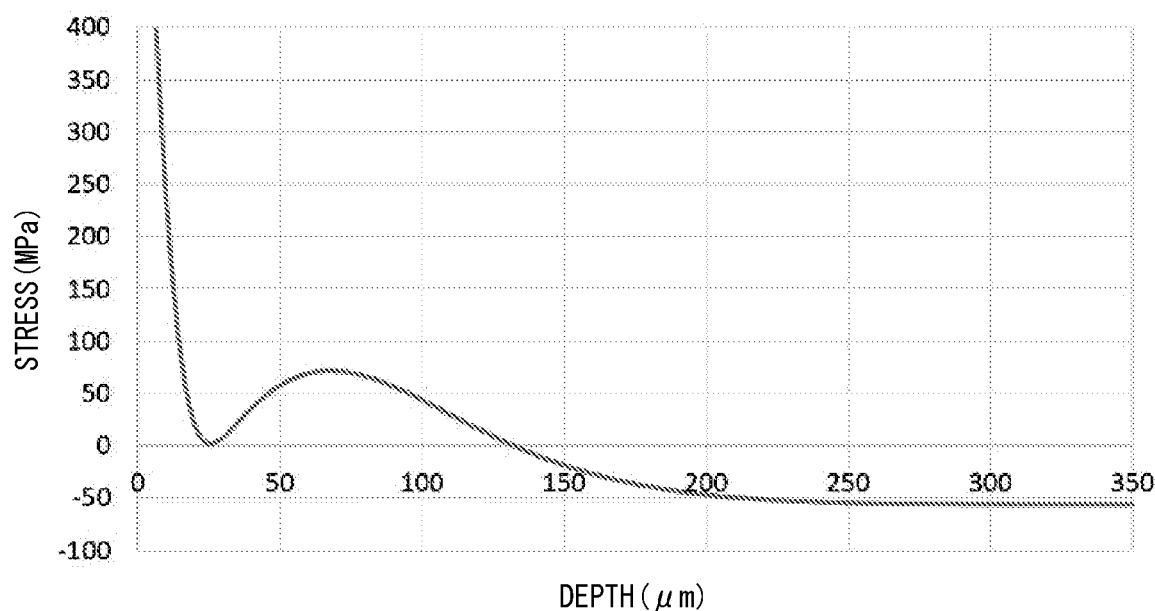
FIG. 8 is a graph for showing the stress profile of a tempered glass according to Sample No. 4.
Figure 9:
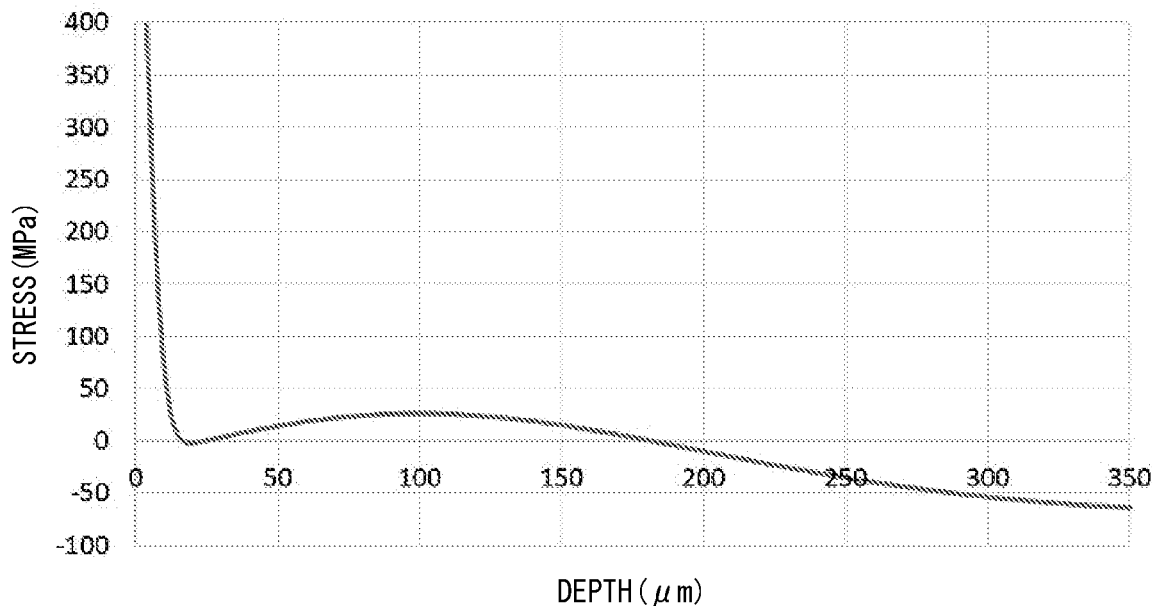
FIG. 9 is a graph for showing the stress profile of a tempered glass according to Sample No. 10.
Figure 10:
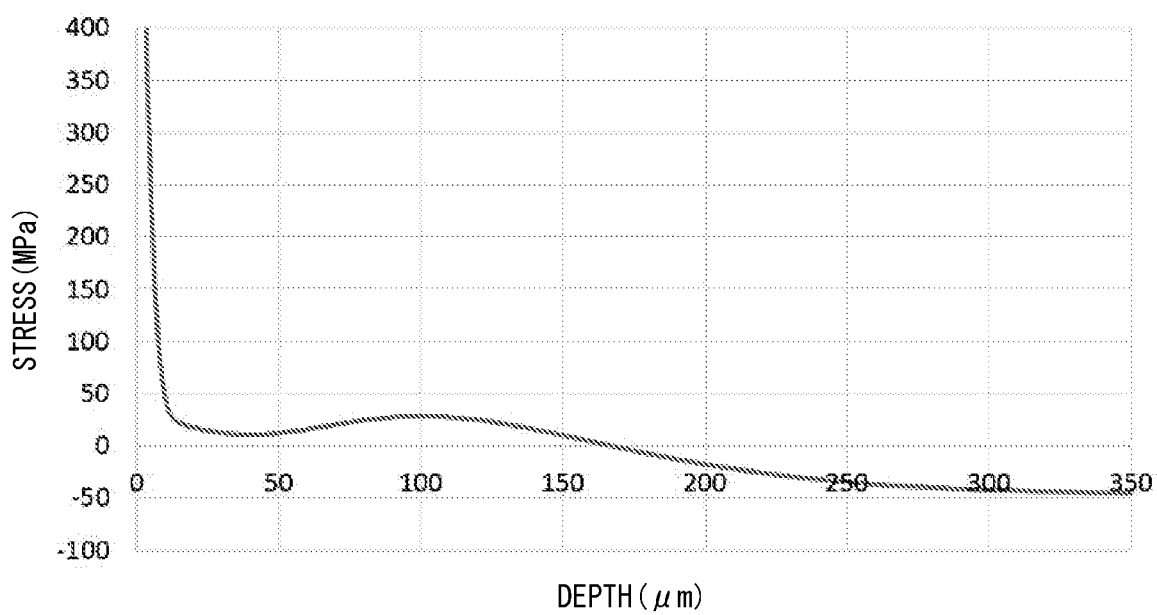
FIG. 10 is a graph for showing the stress profile of a tempered glass according to Sample No. 38.
Figure 11:
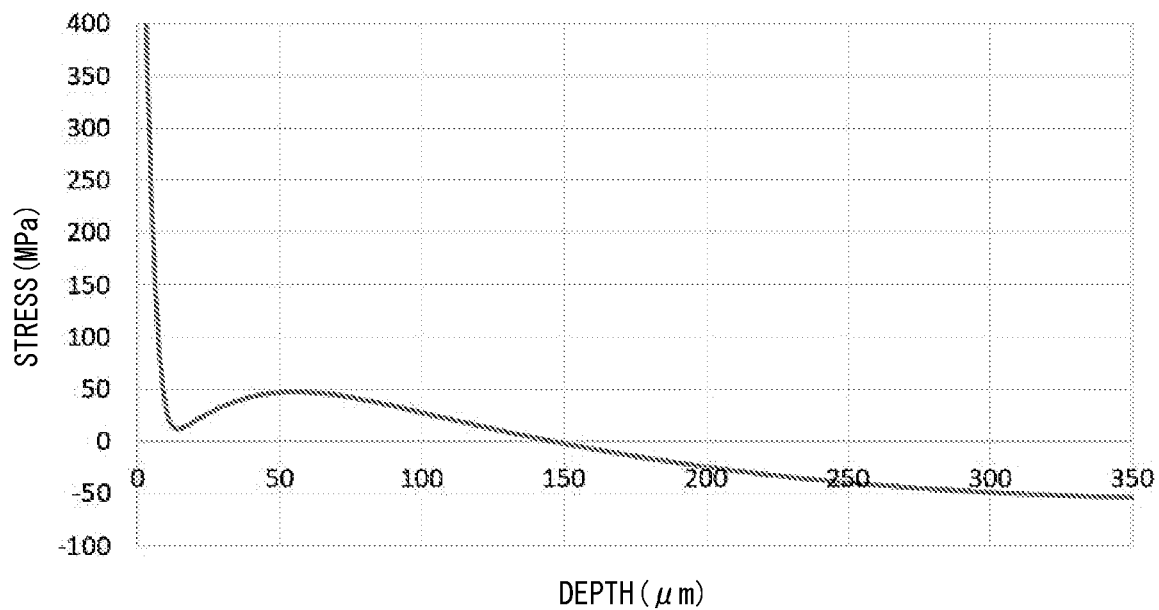
FIG. 11 is a graph for showing the stress profile of a tempered glass according to Sample No. 49.
Figure 12:
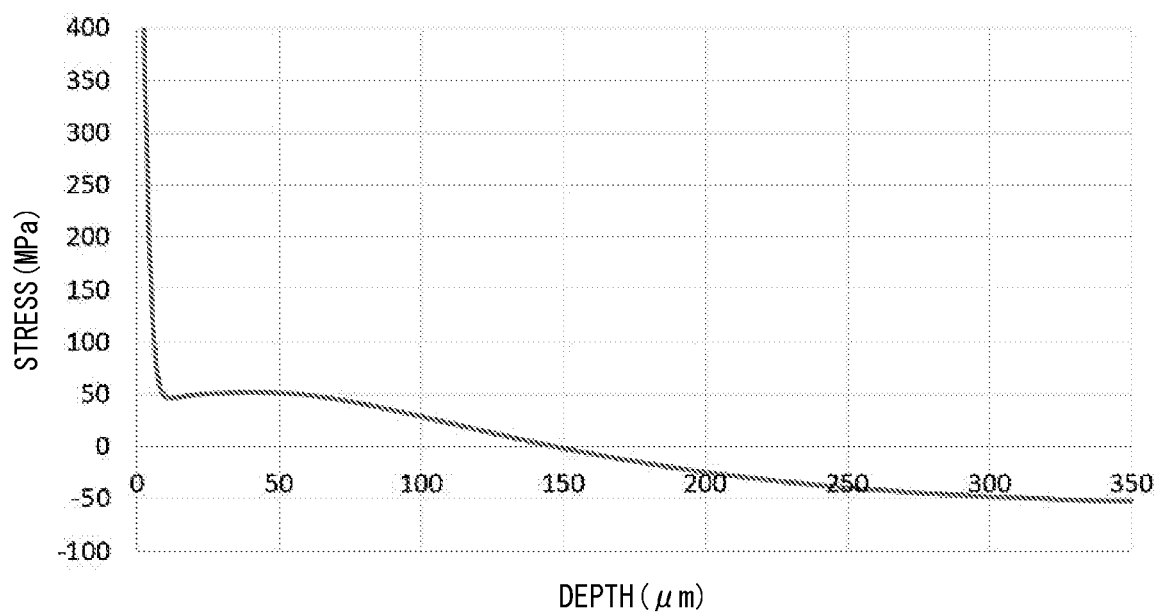
FIG. 12 is a graph for showing the stress profile of a tempered glass according to Sample No. 140.

Examples from the measured stress profiles are shown in FIG. 5 to FIG. 12. FIG. 5 is a graph for showing the stress profile of the tempered glass of Sample No. 1 in its depth direction, FIG. 6 is a graph for showing the stress profile of the tempered glass of Sample No. 2 in its depth direction, FIG. 7 is a graph for showing the stress profile of the tempered glass of Sample No. 3 in its depth direction, FIG. 8 is a graph for showing the stress profile of the tempered glass of Sample No. 4 in its depth direction, FIG. 9 is a graph for showing the stress profile of the tempered glass of Sample No. 10 in its depth direction, FIG. 10 is a graph for showing the stress profile of the tempered glass of Sample No. 38 in its depth direction, FIG. 11 is a graph for showing the stress profile of the tempered glass of Sample No. 49 in its depth direction, and FIG. 12 is a graph for showing the stress profile of the tempered glass of Sample No. 140 in its depth direction. In each of FIG. 5 to FIG. 12, an axis of abscissa indicates a depth (μm) from one main surface, and an axis of ordinate indicates the magnitude of a stress (MPa). In each of FIG. 5 to FIG. 12, a compressive stress is represented by a positive value, and a tensile stress is represented by a negative value.

Characteristics shown in Tables 3 to 18 were calculated on the basis of the stress profiles measured as described above.

In Tables 3 to 18, CSmax represents the stress at the first peak P1, that is, the maximum compressive stress in the compressive stress layer 2. CTmax represents the stress at the second bottom B2, that is, the minimum tensile stress in the tensile stress layer 3. CSb represents the stress (local minimum value) at the first bottom B1, and DOLb represents the depth of the first bottom. B1. CSp represents the stress (local maximum value) at the second peak P2, and DOLp represents the depth of the second peak P2. DOLzero represents the depth of a point at which the stress becomes zero between the second peak P2 and the second bottom B2.

Figure 13:
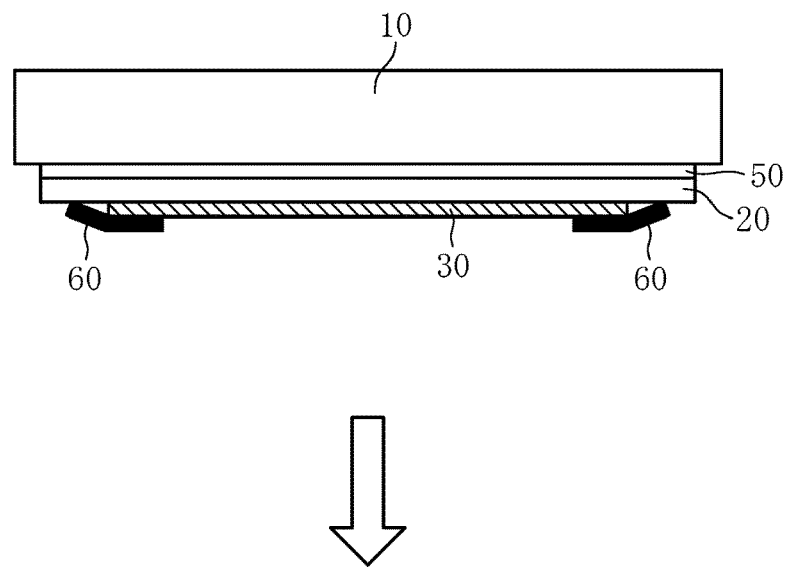
FIG. 13 is a schematic view for illustrating a drop test method in Examples of the present invention.

The simulated casing drop strength represents, as illustrated in FIG. 13, the height at which a glass sample 20 formed of the tempered glass 1 breaks when dropped, onto a surface plate 40 made of iron, in a state in which a simulated casing 10, the glass sample 20, and sandpaper 30 are laminated in the stated order. Specifically, first, the simulated casing 10 is bonded to one main surface of the glass sample 20 processed so as to have a size measuring 65 mm wide by 130 mm long and the thickness T shown in Table 1. The simulated casing 10 is a polycarbonate-made thick sheet member imitating a personal digital assistant, measuring 70 mm wide by 140 mm long by 8 mm thick, and having a mass of 110 g. The simulated casing 10 and the glass sample 20 are bonded by interposing an optical pressure-sensitive adhesive film 50 having a thickness of 150 μm therebetween.

Next, the sandpaper 30 is bonded to the other main surface (main surface on the opposite side to the main surface bonded to the simulated casing) of the glass sample 20 so that a surface (surface on which an abrasive material is arranged) of the sandpaper 30 abuts thereon. The sandpaper 30 has the dimensions of a width of 60 mm and a length of 120 mm, and is placed at the central portion of the other main surface of the glass sample 20. At this time, the sandpaper 30 is placed so that peripheral edge portions of the glass sample 20 may project from the sandpaper 30. The thus projecting peripheral edge portions of the back surface (surface on which the abrasive material is not arranged) of the glass sample 20 are bonded to both end portions of the sandpaper 30 at a plurality of sites with a plurality of plastic tape pieces 60, to thereby bond the sandpaper 30 to the glass sample 20. The plastic tape pieces 60 each measure 19 mm wide by 10 mm long by 0.1 mm thick, and the bonded sites are the respective central portions of the short sides of the sandpaper 30. SiC SANDPAPER P180, P120, P100, and P80, different from each other in abrasive grain coarseness (grain size), manufactured by Riken Corundum Co., Ltd. were each used as the sandpaper 30, and the simulated casing drop strength was measured for each case.

The test body thus obtained was held in a horizontal posture so that the sandpaper 30 was directed downward, and the test body was repeatedly dropped toward the surface plate 40 while a drop height was raised until the glass sample 20 broke. In more detail, in the present application, a test was performed by: clamping the test body with a clamping part formed of an air cylinder; starting the dropping of the test body together with the clamping part; and releasing the clamping with the air cylinder at a position 20 cm above the surface plate 40 to drop the test body toward the surface plate 40 while causing the test body to maintain the horizontal posture. The sandpaper 30 was replaced with a new one every time one drop test was performed. The drop height was set as follows: the drop height was measured with respect to a height of 20 cm from the drop surface, and when the glass sample 20 did not break, the drop height was raised by 10 cm.

All Examples for each of which the simulated casing drop strength was measured (e.g., Samples No. 1 to No. 4) had higher simulated casing drop strengths than Comparative Examples (Samples Nos. 11 and 12), and hence were recognized to have high impact resistances.

In addition, those simulated casing drop strengths were recognized to have some degree of correlation with the following calculated strength.

$$\int_0^T P(x) \cdot \sigma_f(x) dx$$

In the expression, P(x) represents the probability density function of a flaw having a depth x generated in the drop test, and $\sigma_f(x)$ represents the following sum of a stress intensity factor and a compressive stress value.

$$\sigma_f(x) = \frac{K_c}{\sqrt{\pi x}} + \sigma(x)$$

Figure 14:
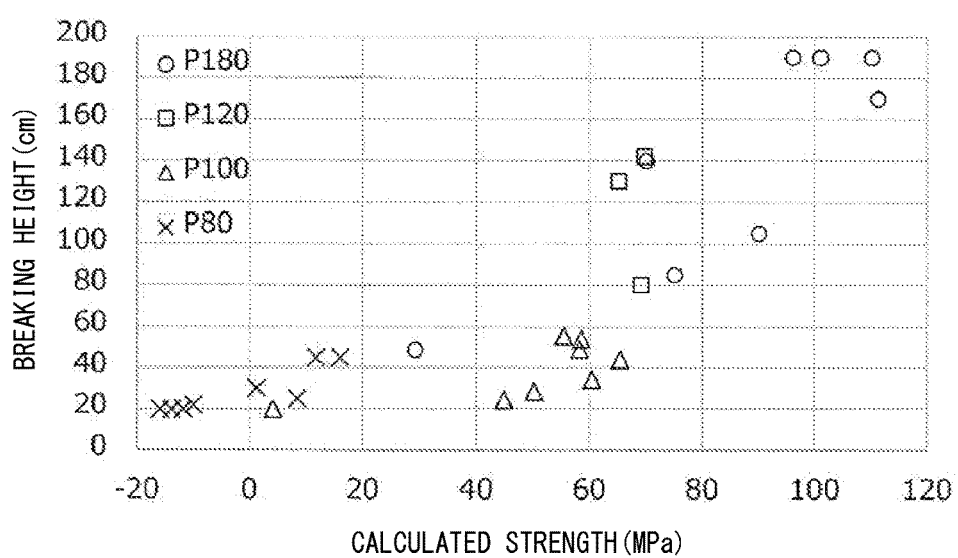
FIG. 14 is a graph for showing a relationship between breaking height and calculated strength in Examples of the present invention.

In the equation, Kc represents the breaking toughness value of mother glass, and σ(x) represents a compressive stress value at the depth x generated by tempering. The depth of the flaw generated in the drop test was sequentially observed to determine the P(x) and the calculated strength, and the correlation thereof with the breaking height in the simulated casing drop test was as shown in a graph shown in FIG. 14. Thus, it was recognized that the drop strength correlated with the calculated strength.

In the tempered glass of the present invention, the calculated strength for P180 is preferably 35 MPa or more, more preferably from 40 MPa to 200 MPa. In addition, the calculated strength for P120 is preferably 10 MPa or more, more preferably from 20 MPa to 150 MPa. The calculated strength for P100 is preferably 5 MPa or more, more preferably from 10 MPa to 100 MPa. The calculated strength for P80 is preferably −13 MPa or more, more preferably from −10 MPa to 50 MPa.

INDUSTRIAL APPLICABILITY

The tempered glass of the present invention may be utilized as apart for, for example, a cellular phone (in particular, a smartphone), a tablet computer, a digital camera, a touch panel display, or a large-screen television.

REFERENCE SIGNS LIST

1 tempered glass
2 compressive stress layer
3 tensile stress layer
10 simulated casing
20 glass sample (tempered glass)
30 sandpaper
40 surface plate
50 optical pressure-sensitive adhesive film
60 plastic tape piece

The invention claimed is:
1. A tempered glass having a surface and a thickness T, wherein a stress profile of the tempered glass, which is obtained by measuring a stress in a depth direction from the surface with a compressive stress being represented by a positive number and a tensile stress being represented by a negative number, comprises:
 a first peak at the surface, at which the compressive stress takes a maximum value;
 a first bottom at which the stress, which reduces from the first peak in the depth direction, takes a local minimum value;

a second peak at which the compressive stress, which increases from the first bottom in the depth direction, takes a local maximum value; and a second bottom at which the tensile stress, which reduces from the second peak in the depth direction, takes a minimum value, wherein the compressive stress at the first peak is 500 MPa or more, wherein the compressive stress at the second peak is from 15 MPa to 250 MPa, wherein the second peak is present at a depth of from 4% to 20% of the thickness T, and wherein the stress at the first bottom is from 0 MPa or more and +65 MPa or less.

2. The tempered glass according to claim 1,
wherein the stress profile has a zero stress point at which the stress becomes zero between the second peak and the second bottom, and
wherein the zero stress point is present at a depth of from 10% to 35% of the thickness T from the surface.

3. The tempered glass according to claim 1, wherein the first bottom is present at a depth of from 0.5% to 12% of the thickness T from the surface.

4. The tempered glass according to claim 1, wherein a distance from the first bottom to the second peak in the depth direction is 3% or more of the thickness T.

5. The tempered glass according to claim 1,
wherein the compressive stress at the first peak is 700 MPa or more, and
wherein the second peak is present at a depth of 7.3% or more of the thickness T from the surface.

6. The tempered glass according to claim 1,
wherein the thickness T is from 0.3 mm to 0.9 mm, and
wherein the tempered glass has the stress profile in each of main surfaces and end surfaces thereof.

7. The tempered glass according to claim 1,
wherein the thickness T falls within a range of 0.45 mm or more and 0.85 mm or less,
wherein the compressive stress at the first peak falls within a range of 700 MPa or more and 850 MPa or less,
wherein the compressive stress at the second peak falls within a range of 20 MPa or more and 80 MPa or less,
wherein the second peak is present within a depth range of 7.3% or more and 20% or less of the thickness T from the surface,
wherein the stress profile has a zero stress point at which the stress becomes zero between the second peak and the second bottom,
wherein the zero stress point is present within a depth range of 17% or more and 25% or less of the thickness T from the surface, and
wherein a maximum absolute value of the tensile stress falls within a range of 40 MPa or more and 60 MPa or less.

8. The tempered glass according to claim 1, wherein the tempered glass comprises as a glass composition, in terms of mass %, 40% to 70% of $SiO_2$, 10% to 30% of $Al_2O_3$, 0% to 10% of $B_2O_3$, 2% to 11% of $Li_2O$, 5% to 25% of $Na_2O$, 0% to 10% of $K_2O$, 0% to 6% of MgO, 0% to 10% of ZnO, and 0% to 20% of $P_2O_5$.

* * * * *